United States Patent [19]

Muramatsu

[11] Patent Number: 5,752,126
[45] Date of Patent: May 12, 1998

[54] IMAGE FORMING APPARATUS

[75] Inventor: Masanori Muramatsu, Kawasaki, Japan

[73] Assignee: Canon Kabushiki Kaisha, Tokyo, Japan

[21] Appl. No.: 384,687

[22] Filed: Feb. 6, 1995

Related U.S. Application Data

[63] Continuation of Ser. No. 837,921, Feb. 20, 1992, abandoned.

[30] Foreign Application Priority Data

Feb. 22, 1991 [JP] Japan ................................ 3-028613
Feb. 22, 1991 [JP] Japan ................................ 3-028634

[51] Int. Cl.$^6$ ................................................ G03G 15/00
[52] U.S. Cl. ........................ 399/44; 399/46; 399/49; 399/74
[58] Field of Search .................. 347/115; 355/208, 355/246, 326 R, 327; 118/689, 691, 645; 358/298, 518, 521, 523; 430/43; 399/44, 46, 49, 74, 39, 51

[56] References Cited

U.S. PATENT DOCUMENTS

| | | | |
|---|---|---|---|
| 4,178,095 | 12/1979 | Champion et al. | 399/29 |
| 4,619,522 | 10/1986 | Imai | 399/55 |
| 4,626,096 | 12/1986 | Ohtsuka et al. | 399/44 |
| 4,680,646 | 7/1987 | Ikeda et al. | 358/298 |
| 4,816,863 | 3/1989 | Lee | 399/51 |
| 4,888,618 | 12/1989 | Ishikawa | 399/39 |
| 4,888,636 | 12/1989 | Abe | 399/180 |
| 4,894,685 | 1/1990 | Shoji | 399/39 |
| 4,982,232 | 1/1991 | Naito | 399/51 |
| 5,057,867 | 10/1991 | Ishigaki et al. | 399/43 |
| 5,067,435 | 11/1991 | Hosaka | 399/64 |
| 5,089,848 | 2/1992 | Kusuda et al. | 399/31 |
| 5,146,273 | 9/1992 | Yamada | 399/31 |
| 5,148,289 | 9/1992 | Nishiyama et al. | 399/72 |
| 5,151,740 | 9/1992 | Fujimoto | 399/59 |

FOREIGN PATENT DOCUMENTS

| | | | |
|---|---|---|---|
| 0037731 | 10/1981 | European Pat. Off. | G03G 13/06 |
| 0276107 | 7/1988 | European Pat. Off. | H04N 1/20 |
| 276112 | 7/1988 | European Pat. Off. | |
| 3432515 | 3/1985 | Germany | H04N 1/22 |
| 3512060 | 10/1985 | Germany | |
| 2212419 | 7/1989 | United Kingdom | G03G 15/01 |

*Primary Examiner*—John E. Barlow, Jr.
*Attorney, Agent, or Firm*—Fitzpatrick, Cella, Harper & Scinto

[57] ABSTRACT

An image forming apparatus includes a generating section for generating an image signal representing an image of a predetermined density, an image forming section for forming an image on a recording medium on the basis of the image signal generated by the generating section, a measurement section for measuring the density of the image formed on the recording medium, and a control section for determining a condition for image formation on the basis of a measurement result from the measurement section. The control section selects a density of the image signal to be generated from the generating section according to the environment of the image forming section, or to an operation time of the image forming section.

23 Claims, 34 Drawing Sheets

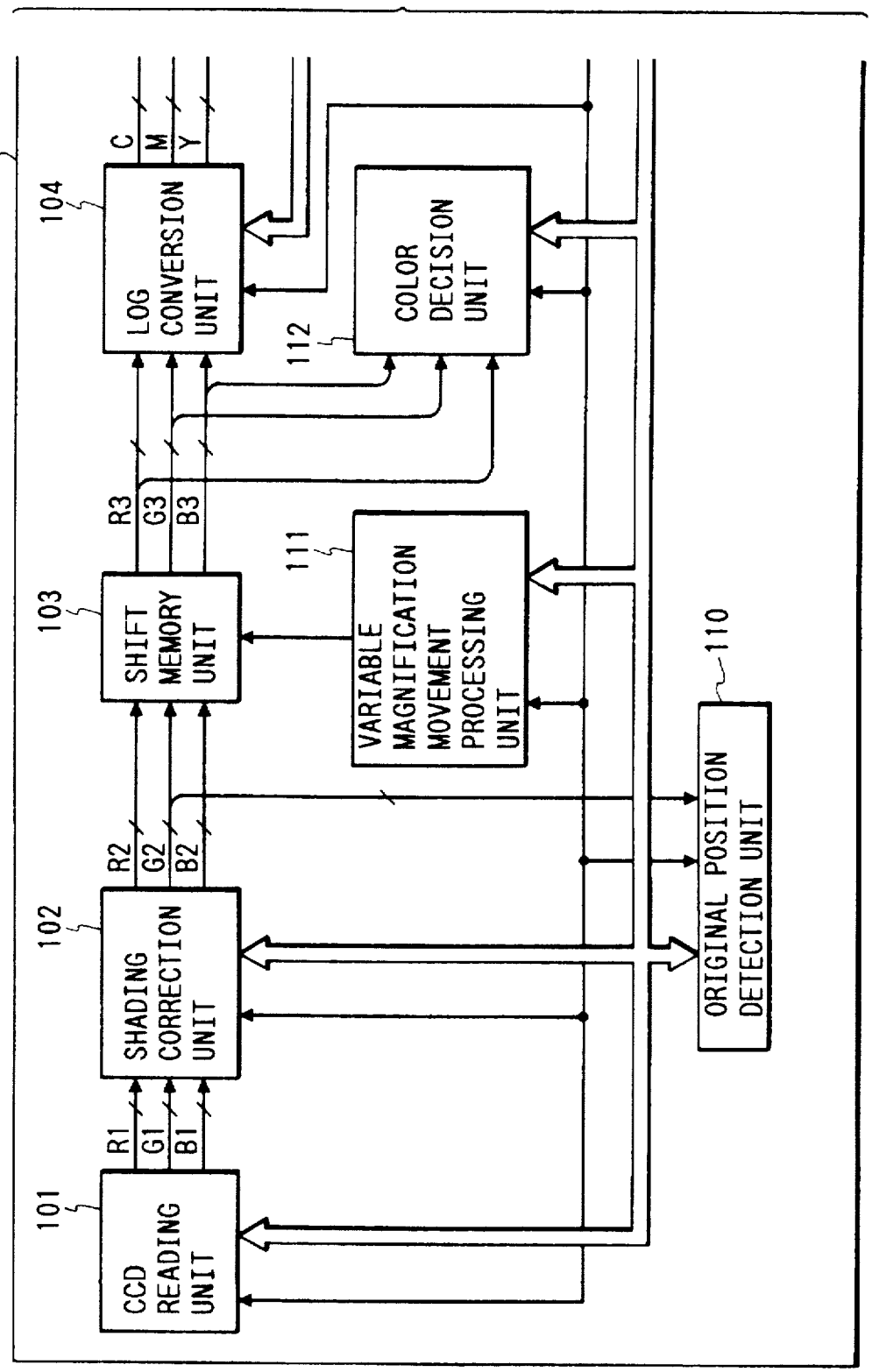

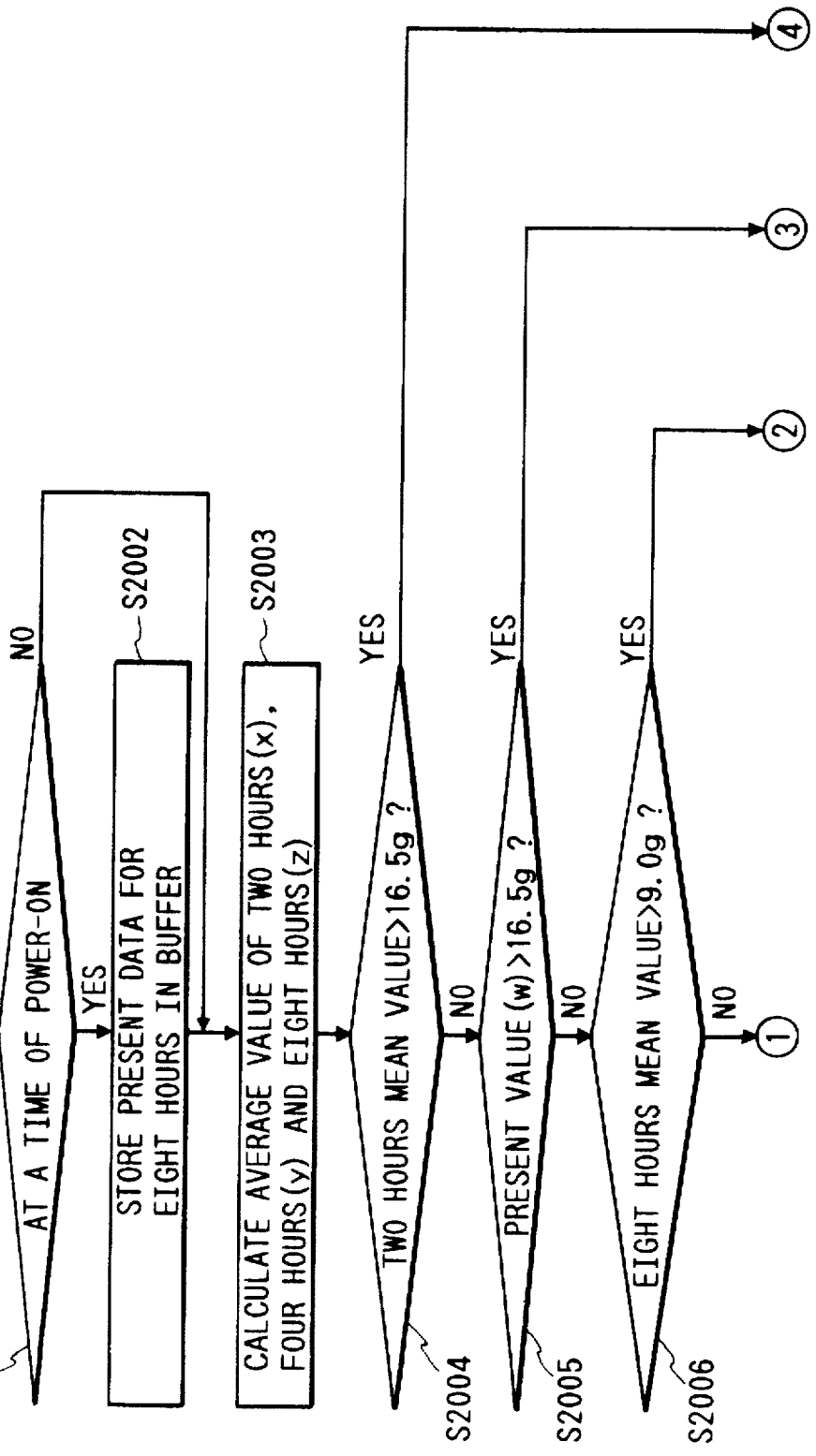

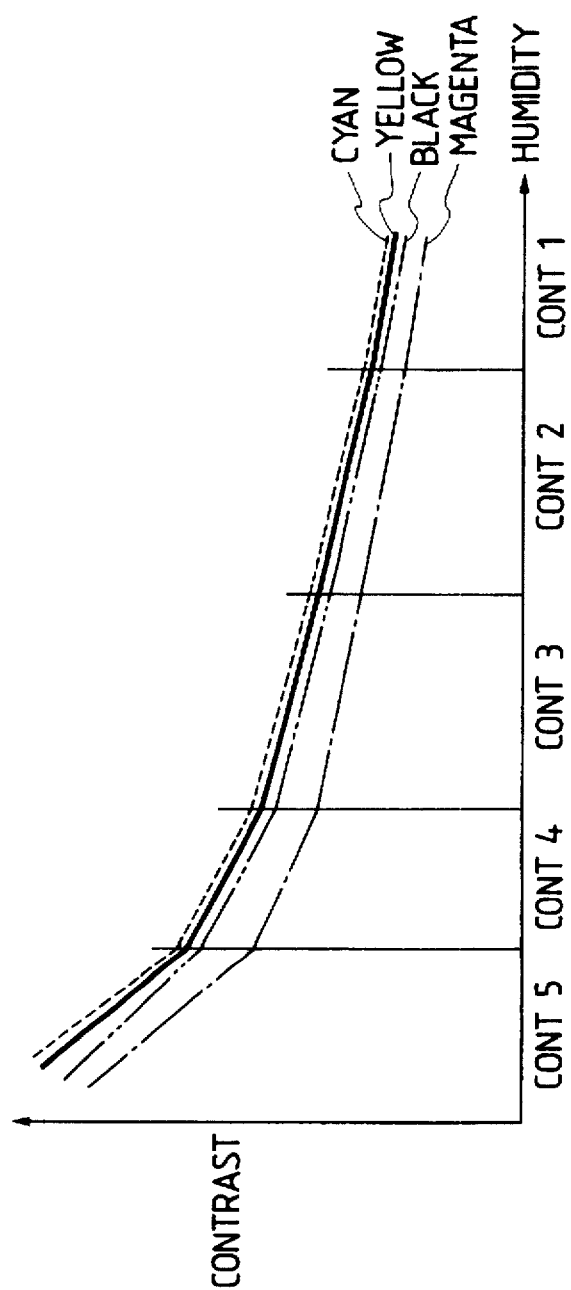

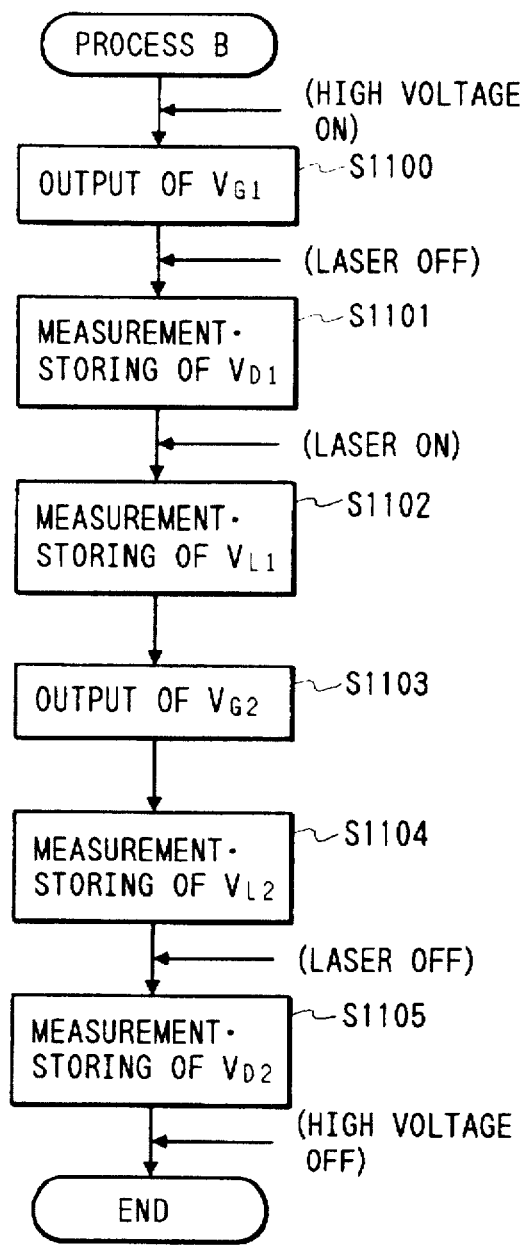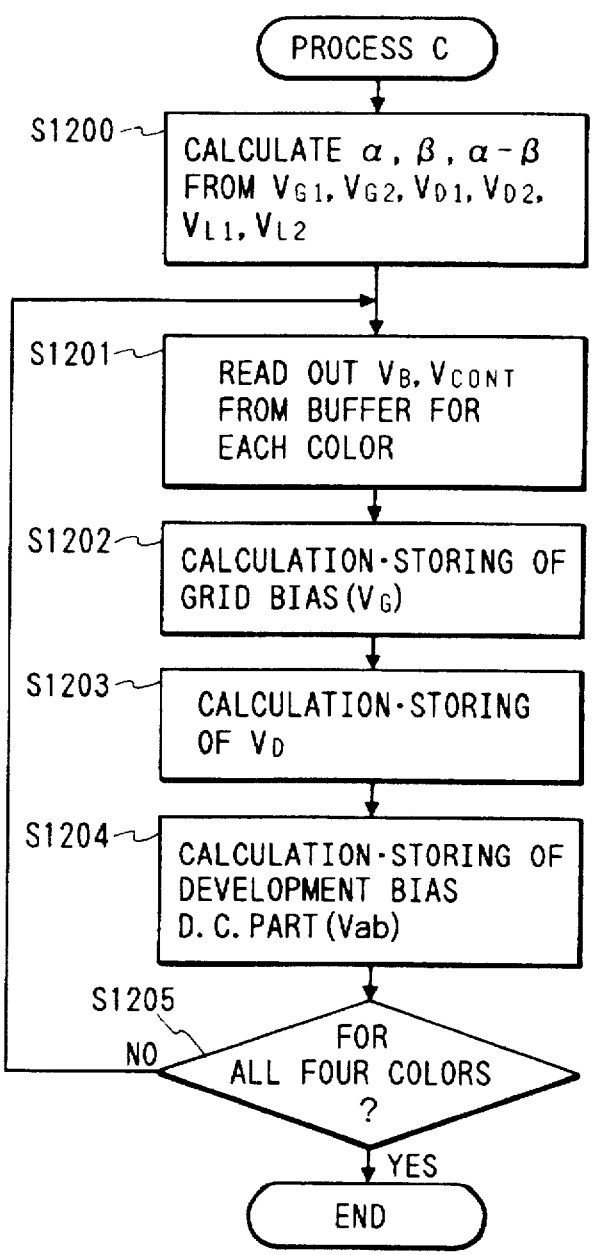

FIG. 30

| TONER COLOR | VIDEOp / ENVIRONMENT FLAG | 00H | 10H | 20H | 30H | 40H | 50H | 60H | 70H | 80H | 90H | A0H | B0H | C0H | D0H | E0H | F0H | FFH |
|---|---|---|---|---|---|---|---|---|---|---|---|---|---|---|---|---|---|---|
| MAGENTA | CONT 1 | | | | | ◎ | △ | | | | | | | ◎ | ◎ | ◎ | ◎ | |
| MAGENTA | CONT 2 | | | | | | ◎ | △ | △ | | | | | | ◎ | ◎ | ◎ | |
| MAGENTA | CONT 3 | | | | | | ◎ | △ | △ | | | | | | ◎ | ◎ | ◎ | |
| MAGENTA | CONT 4 | | | | | | ◎ | ◎ | △ | △ | | | | ○ | ◎ | ◎ | ◎ | |
| MAGENTA | CONT 5 | | | | | | ◎ | ◎ | △ | △ | | | △ | ○ | ◎ | ◎ | ◎ | |
| CYAN | CONT 1 | | | | | ○ | ◎ | △ | | | | | | | ◎ | ◎ | ◎ | |
| CYAN | CONT 2 | | | | | | ◎ | △ | △ | | | | | | ◎ | ◎ | ◎ | |
| CYAN | CONT 3 | | | | | | ◎ | △ | △ | | | | | | ◎ | ◎ | ◎ | |
| CYAN | CONT 4 | | | | | | ◎ | △ | △ | | | | | ○ | ◎ | ◎ | ◎ | |
| CYAN | CONT 5 | | | | | | ◎ | △ | △ | | | | △ | ○ | ◎ | ◎ | ◎ | |
| YELLOW | | | | | | | | | | | | | | | | | | |

◎ : ALWAYS EXECUTE

○ : MEASURE AFTER PREDETERMINED TIME FROM PREVIOUS MEASUREMENT

△ : MEASURE WHEN ENVIRONMENT CHANGES

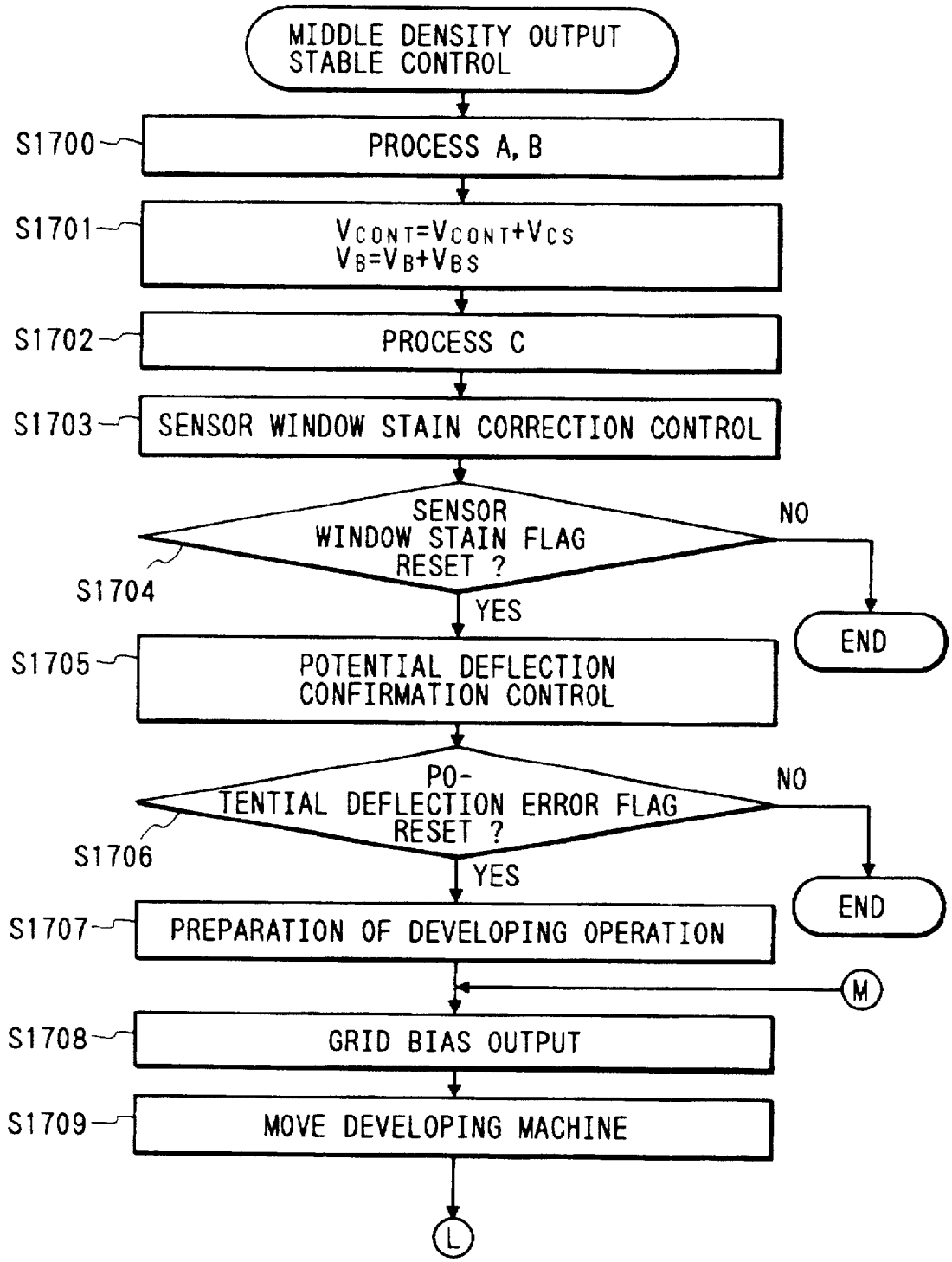

FIG. 36

| IMAGE CORRECTION VALUE | | | | |
|---|---|---|---|---|
| | M | C | Y | K |
| $V_{CONT}$ | 200V | 220V | 200V | 220V |
| $V_{CS}$ | 10V | 20V | -10V | 30V |
| $V_B$ | 160V | 160V | 160V | 160V |
| $V_{BS}$ | -10V | 5V | 10V | 15V |
| Dcrct | 0.98 | | | |
| POTENTIAL DEFLECTION | 10V | | | |

FIG. 37

| ⟨CONTROL HISTORY M⟩ | | |
|---|---|---|
| DATE | 1991·2·05 | 1991·02·06 |
| TIME | 08:00 | 07:30 |
| PRIMARY | 570 μA | 570 μA |
| GRID | 500V | 510V |
| $V_{CONT}$ | 350V | 360V |
| $V_{CS}$ | 5V | 10V |

IMAGE FORMING APPARATUS

This application is a continuation of application Ser. No. 07/837,921 filed Feb. 20, 1992, now abandoned.

BACKGROUND OF THE INVENTION

1. Field of the Invention

The present invention relates to an image forming apparatus, which can reproduce a gray-scale image.

2. Related Background Art

In a conventional image processing apparatus of an electrophotographic system, such as a copying machine, a laser beam printer, or the like, it is known that, in order to maintain a constant output density of a formed image, a change in environment of a developer is measured by an environment sensor, and image formation conditions and image processing conditions are changed by a control means in accordance with the type of developer, environmental conditions, and environmental history (see U.S. Pat. No. 4,888,618).

In this U.S. Pat. No. 4,888,618, however, when a gray-scale image is formed, a high-density portion of an image can be formed to have a proper density, but a low-density portion is often formed with improper density. As a result, a high-quality image often cannot be obtained.

Another method is also proposed. In this method, a plurality of predetermined density patterns formed for density detection on an image carrier are detected, and detection results are fed back to image formation conditions and image processing conditions (see U.S. Pat. No. 4,888,636, and U.S. patent application Ser. No. 760,505, for example).

In U.S. Pat. No. 4,888,636 and U.S. patent application Ser. No. 760,505, however, only predetermined density patterns can be formed, and it is often insufficient for gray-scale control with higher precision.

When an image having higher quality is to be formed, for example, a color printer, which can form four color toner images, and can output 256 gray-scale levels, must output 4×256 patterns. If this operation is performed every time each pattern is output, this results in a decrease in throughput, and an increase in toner consumption.

When a density pattern formed for density detection on a photosensitive drum is detected by a sensor, if the sensor is stained with toner, precise density measurement cannot be performed, and high-precision gray-scale control is disturbed.

The photosensitive body (drum) slightly suffers from eccentricity since it is rotated about a shaft. Therefore, even when the photosensitive drum is uniformly changed, the surface potential varies depending on the position on the surface of the drum, and high-precision gray-scale control often cannot be performed.

In U.S. Pat. No. 4,888,636 and U.S. patent application Ser. No. 760,505, gray-scale control is performed by correcting only γ characteristics over the entire reproducible density range. However, since image signals having high- and low-density levels have slow γ characteristic curves, it is not effective to correct the γ characteristics. Therefore, the image signals having high- and low-density levels cannot be precisely reproduced.

When a low-density image is formed on a photosensitive body, and its density is measured, if the density level of an image signal is 00H, the output from a density sensor becomes a minimum level. However, in terms of electrophotographic characteristics, the output from the density sensor becomes the maximum level even when the density level is larger than 00H. Therefore, it is difficult to attain gray-scale control at a low density.

In a normal image formation mode, since a toner on a photosensitive body is transferred onto a transfer sheet, a transfer drum is not easily stained. After the end of or before the beginning of image formation, the transfer drum is cleaned. However, when gray-scale control is performed, if a toner image formed for density detection on the photosensitive body is not transferred onto a transfer sheet so as not to waste transfer sheets, the transfer drum is stained. When the transfer drum is cleaned before beginning of normal image formation, the stain of the transfer drum can be removed. However, when gray-scale control is repetitively performed, or when a machine is left in a non-image formation state after gray-scale control, it is not easy to remove the stain of the transfer drum by cleaning the transfer drum before image formation. In addition, a long cleaning time is required, and this requires a long time until image formation is started.

When the setup environment of the image forming apparatus is changed due to use of air conditioners, a high-quality image can no longer be obtained based on control values and γ characteristics determined in gray-scale control before the air conditioners are turned on. The same applies to a case where the image formation count is large.

SUMMARY OF THE INVENTION

It is an object of the present invention to provide an image forming apparatus, which can eliminate the conventional drawbacks.

It is another object of the present invention to provide an image forming apparatus, which can optimally control an image pattern used for detecting an image density in accordance with the environment of a machine, and a time associated with image formation, thereby improving throughput and saving developer consumption.

It is still another object of the present invention to provide an image forming apparatus, which can more precisely perform image stabilization control by correcting stain of a sensor for detecting an image density on a recording medium.

It is still another object of the present invention to provide an image forming apparatus, which can precisely perform image stabilization control by correcting potential nonuniformity and density nonuniformity of an image formed on a recording medium.

It is still another object of the present invention to provide an image forming apparatus, which can form an image having gray-scale characteristics as high as possible even when a photosensitive body is deteriorated or when the states of a charger and a developing machine are changed, does not so frequently require maintenance by a service person, and can improve operating efficiency of the apparatus, since the image forming apparatus sets a proper contrast potential of a latent image and forms a sample image according to an environmental condition of the apparatus, measures the density of the sample image, and corrects the contrast potential on the basis of the measured density.

It is still another object of the present invention to provide an image forming apparatus, which divides a reproducible density range into a plurality ranges, and performs different gray-scale control operations in these ranges, thereby obtaining an image having high gray-scale characteristics in every density region.

It is still another object of the present invention to provide an image forming apparatus. which cleans a transfer drum upon completion of each mode of gray-scale control. thereby preventing the interior of the apparatus from being stained. and allowing smooth normal image formation.

It is still another object of the present invention to provide an image forming apparatus. which performs gray-scale control when an environment changes or an image formation count is increased. thereby always obtaining an image having high gray-scale characteristics.

It is still another object of the present invention to provide an image forming apparatus. which forms a plurality of images in low-density regions having different densities, measures the densities of the images. and obtains the density level of an image signal corresponding to a minimum output density level. thereby obtaining an image free from fogging and having high gray-scale characteristics even in a low-density region.

Other objects of the present invention will become apparent from the following description taken in conjunction with the accompanying drawings. and the appended claims.

BRIEF DESCRIPTION OF THE DRAWINGS

FIG. 18 is a graph showing the relationship between the environmental contrast and the humidity;

FIG. 19 is a flow chart showing processing for measuring $V_D$ and $V_L$;

FIG. 20 is a flow chart showing processing for obtaining $V_G$ and $V_{db}$;

FIG. 30 shows the signal $VIDEO_P$ to be set in middle density output stable control;

FIG. 36 is a view showing a display example of image formation conditions;

FIG. 37 is a view showing a history display of image formation conditions;

DETAILED DESCRIPTION OF THE PREFERRED EMBODIMENTS

Figure 1:
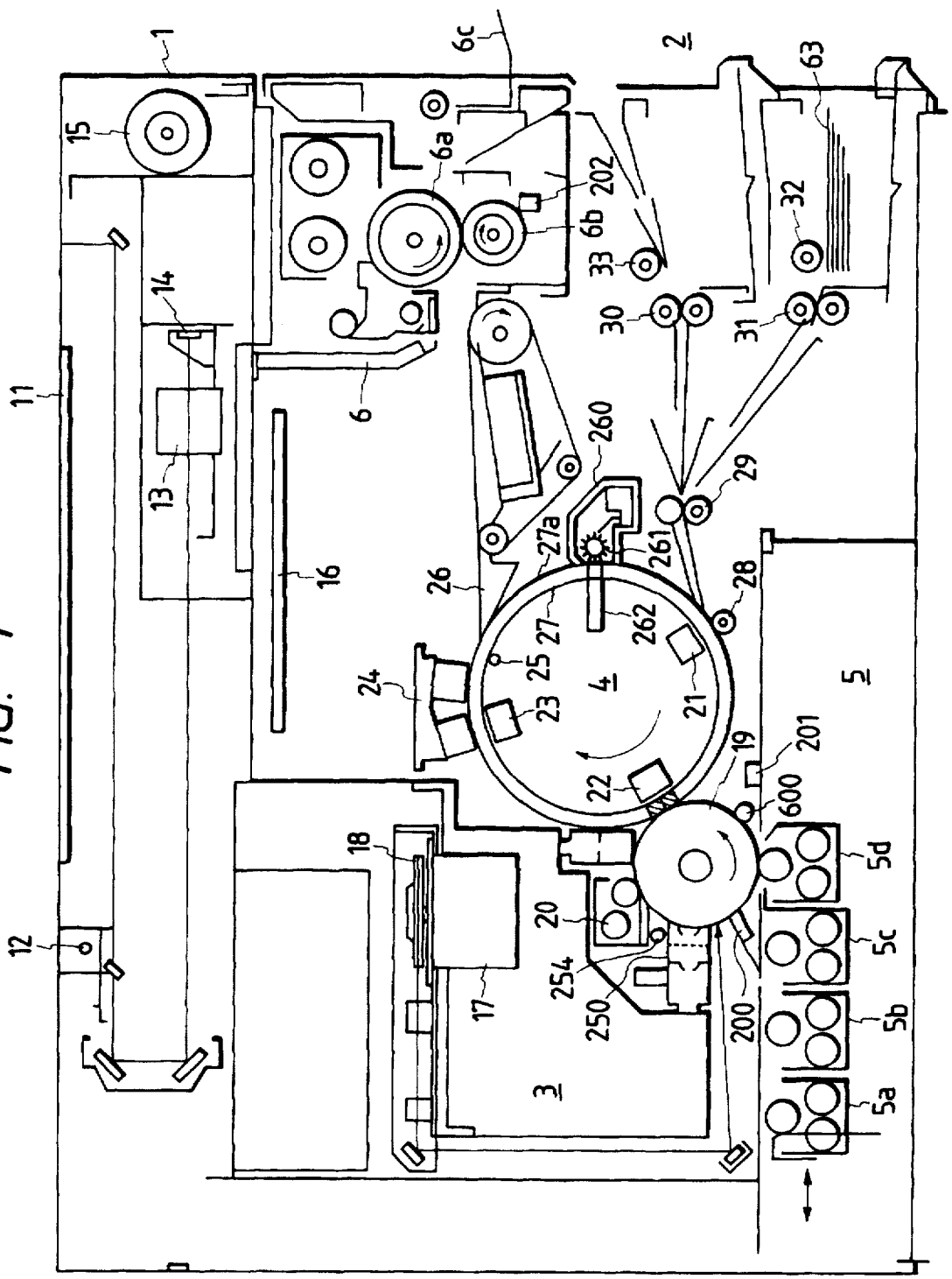
FIG. 1 is a sectional view of a color copying apparatus to which the present invention can be applied.

FIG. 1 is a sectional view for explaining an arrangement of a color copying apparatus according to an embodiment of the present invention. In FIG. 1. a reader unit 1 is constituted by an original table (platen glass) 11. an original illumination lamp 12. a focusing lens 13. an image pickup element (comprising. e.g.. a charge-coupled element such as a CCD) 14. an optical motor 15. and the like.

An original feed unit 2 is constituted by paper feed rollers 30 and 31. pickup rollers 32 and 33. and the like. and feeds a transfer sheet (transfer medium) 63 according to a driving command from a controller 16.

An image forming unit 3 is constituted by a scanner motor 17, a polygonal mirror 18, a photosensitive body drum 19 as an image carrier, a cleaner 20, a primary charger 250, and a pre-exposure lamp 254. The controller 16 focuses a laser beam emitted from a laser light source onto the photosensitive body drum 19 on the basis of an image signal obtained by processing outputs from the image pickup element 14, thereby forming an electrostatic latent image on the drum.

A transfer unit 4 is constituted by an attraction charger 21, a transfer charger 22, peeling chargers 23, a high-voltage unit 24, an inner pushing roller 25, a peeling pawl 26, a transfer medium holding member (transfer or copy drum) 27, an attraction roller 28, registration rollers 29, a transfer cleaning device 260, and the like. The transfer sheet 63 is stopped by the paper feed rollers 30 or 31 at the position of the registration rollers 29 to form a predetermined amount of loop, and is fed again by the registration rollers 29 at a timing for synchronizing the image start position with the photosensitive body drum 19. The transfer sheet 63 fed by driving the registration rollers 29 is electrostatically attracted to the transfer medium holding member 27 by the attraction roller 28, serving as a counter electrode, and the attraction charger 21. The transfer charger 22 transfers each color developer developed on the photosensitive body drum 19 onto the transfer sheet 63. The peeling chargers 23 serving as dischargers discharge an electric charge on the transfer sheet 63, thereby weakening an attraction force to the transfer medium holding member 27.

The controller 16 adjusts the paper feed timings of transfer sheets 63 to be sequentially attracted by the transfer medium holding member 27 on the basis of a selected transfer sheet size, and an arrangement state of developing machines 5a to 5d of a developing unit 5, which is driven in the horizontal direction by a motor, with respect to the photosensitive body drum 19. Thus, the controller 16 causes the transfer medium holding member 27 to attract a plurality of transfer sheets 63 at predetermined time intervals, and determines the paper feed/attraction timings of following transfer sheets 63 to the transfer medium holding member 27.

In this manner, when the transfer sheet 63 attracted on the transfer medium holding member 27 is rotated along the arrangement position of the transfer charger 22, the transfer charger 22 gives an electric charge having a polarity opposite to that of a toner to the back surface of the transfer medium holding member 27, thereby transferring a first-color image. Thereafter, the developing machines 5a to 5d are sequentially moved. Upon completion of developing/transfer processes of the necessary colors, the attraction force of the transfer sheet 63 with respect to the transfer medium holding member 27 is weakened, and the pair of peeling chargers 23, which oppose to sandwich the transfer medium holding member 27 therebetween, apply an AC corona discharge to discharge the transfer sheet 63.

Figure 2:
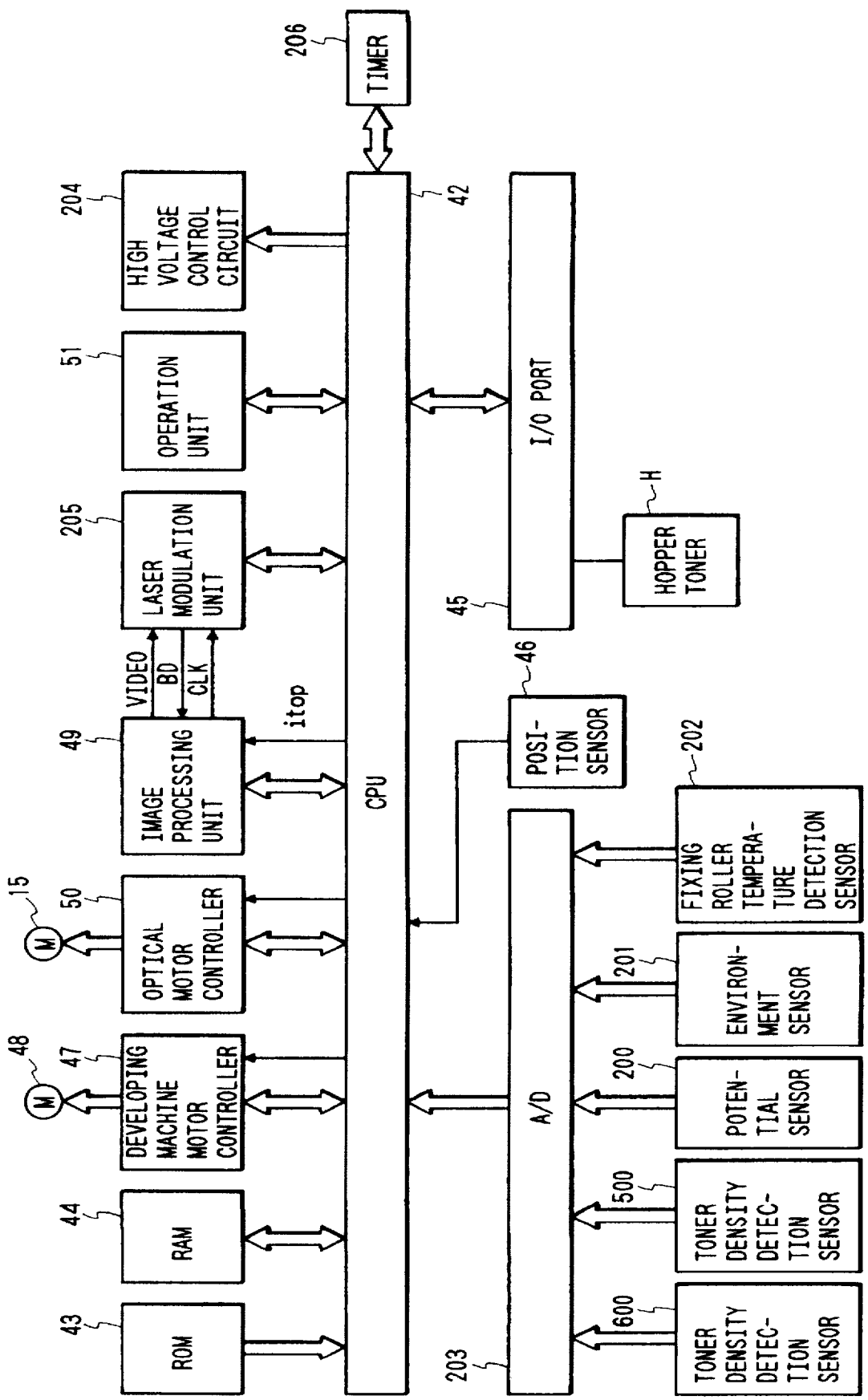
FIG. 2 is a block diagram showing an arrangement of the copying apparatus shown in FIG. 1.

FIG. 2 is a block diagram for explaining the arrangement of the controller 16 shown in FIG. 1. A CPU 42 systematically controls a copying sequence according to a control program stored in a ROM 43. A RAM 44 serves as a work memory of the CPU 42.

An operation unit 51 has keys for inputting various pieces of information such as a copy count, a paper size, a color mode, and the like set by a user.

An I/O port 45 is constituted by output ports for various motors and clutches, and input ports for receiving signals from sensors, and is controlled by the CPU 42 according to an image forming operation.

A timer 206 has a calendar function for managing a date and a time, and manages data necessary for time measurement during the image forming operation.

Figure 3:
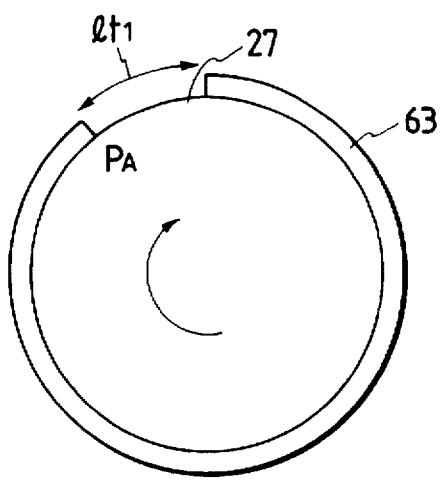
FIG. 3 is a view showing an attraction state of a transfer sheet onto a transfer drum.
Figure 4:
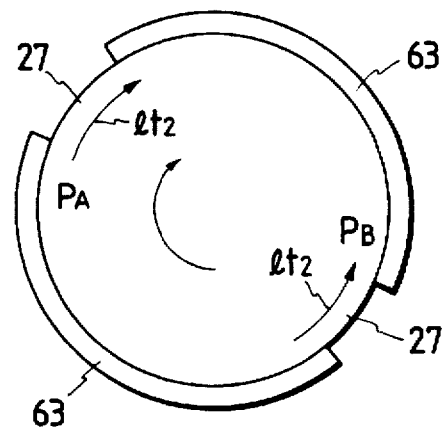
FIG. 4 is a view showing the attraction state of a transfer sheet onto the transfer drum.

A position (ITOP) sensor 46 detects predetermined positions (image leading end positions $P_A$ and $P_B$) of the transfer medium holding member 27 shown in FIGS. 3 and 4, and outputs an image timing signal ITOP for determining an image output timing, a transfer timing, and a developing timing to the CPU. 42. The image timing signal ITOP is used in an image processing unit 49 (to be described below).

A developing machine motor controller 47 drives a motor 48 to move and align, at a high speed, a moving table (not shown), which carries the developing machines 5a to 5d shown in FIG. 1. When four-color image formation is performed, and when a plurality of transfer sheets 63 (a maximum of two sheets in this embodiment) are to be attracted on the transfer medium holding member 27, the CPU 42 determines the paper feed and attraction timings, so that paper feed processing is performed by delaying the paper feed timing of the second transfer sheet 63 by half a rotation of the transfer medium holding member 27 with respect to that of the first transfer sheet 63.

The image processing unit 49 causes the CCD 14 to read an original on the original table 11, performs a known image processing operation, and finally transfers the read image as an output image signal VIDEO to a laser modulation unit 205 (to be described later) together with a pixel synchronization signal CLK.

The laser modulation unit 205 controls a laser (not shown) according to the image signal VIDEO sent from the image processing unit 49.

An optical motor controller 50 controls a driving operation of the optical motor 15 for reciprocating an original scanning unit.

Figure 13B:
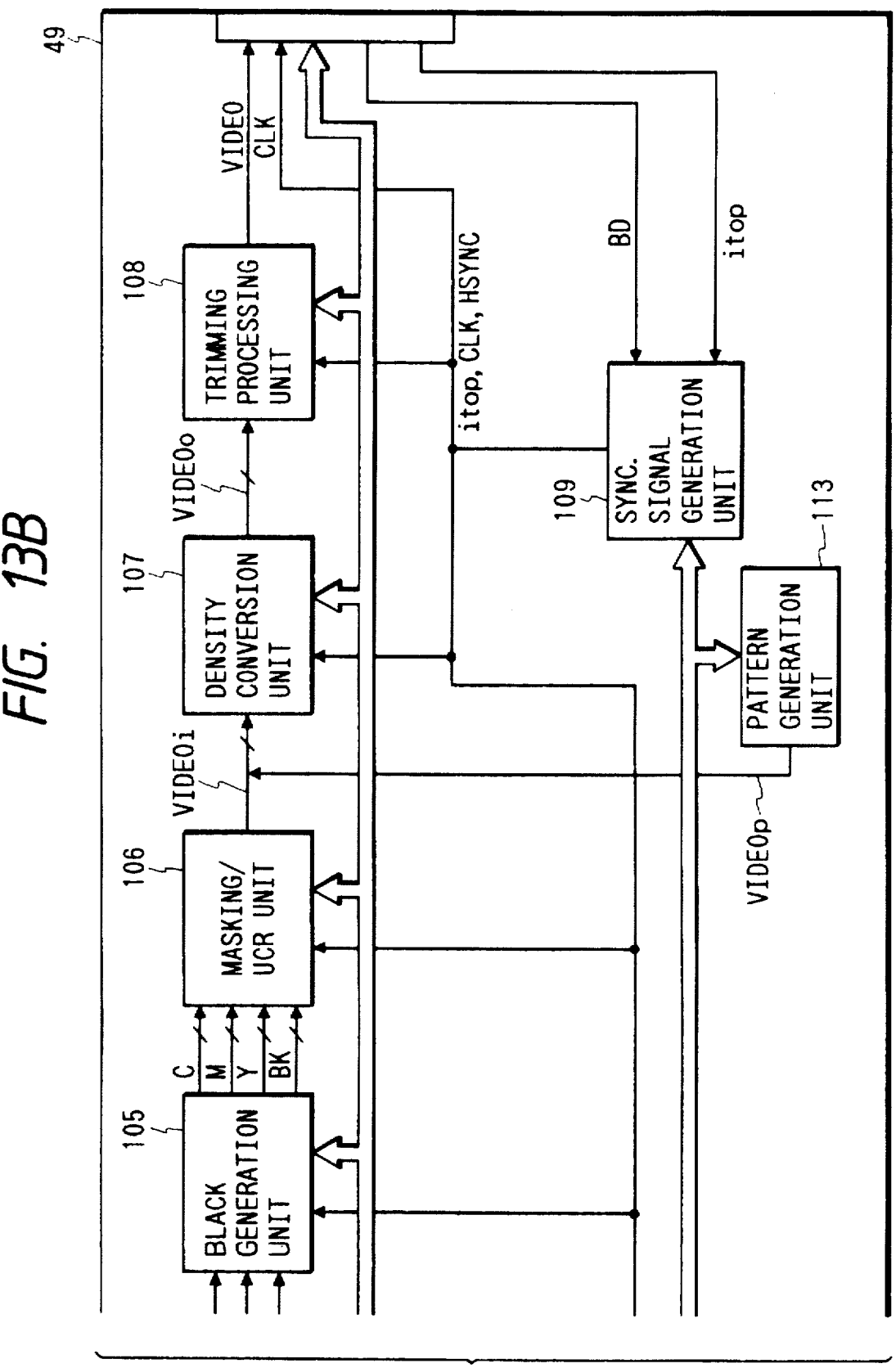
FIG. 13. consisting of FIGS. 13A and 13B. is a detailed block diagram of an image processing unit.

FIG. 13 is a detailed block diagram of the image processing unit 49. The image processing unit 49 will be described in detail below with reference to FIG. 13.

A CCD reading unit 101 includes the color sensors 14 capable of independently obtaining analog image signals of color images R (red), G (green), and B (blue), amplifiers for amplifying the signals in units of colors, and A/D converters for converting the analog signals into 8-bit digital signals.

Signals, which are shading-corrected in units of colors in a shading correction unit 102, are then subjected to correction of shifts among colors and pixels in a shift memory unit 103, and the corrected signals are then sent to a color decision unit 112 (to be described later), and a LOG conversion unit 104 for performing logarithmic correction for optical density conversion.

Density signals Y (yellow), M (magenta), and C (cyan) as outputs from the LOG conversion unit 104 are input to a black generation unit 105. In this unit, for example, a black signal Bk is generated by Min(Y, M, C).

Furthermore, a masking/UCR unit 106 corrects the filter characteristics and toner density characteristics of the color sensors of the Y, M, C, and Bk signals output from the black generation unit 105, and removes undercolors from these signals. Thereafter, one of the four-color signals to be developed is selected.

The color image signals are density-converted by a density conversion unit 107 in accordance with the developing characteristics of a printer or an operator's favor, and thereafter, desired sections of the image signals are edited by a trimming processing unit 108. The edited signals are then supplied to the laser modulation unit 205, and are converted into a laser beam. The laser beam is radiated on the photosensitive body.

A synchronization signal generation unit 109 generates a horizontal synchronization signal HSYNC, a pixel synchronization signal CLK, and the like used in the image processing unit 49 on the basis of a horizontal synchronization signal (BD (beam detect) signal) and a vertical synchronization signal (ITOP (image top) signal) sent from a printer, and synchronized with a printing operation of each line. The unit 109 supplies the generated signals to the respective processing units.

An original position detection unit 110 detects the original position and size on the basis of a shading-corrected green (G) signal. A variable magnification movement processing unit 111 controls the read/write periods and timings of data from/to the shift memory unit, thus realizing a variable magnification and movement of an image.

A pattern generation unit 113 is used for outputting a signal having a constant density in place of image signals from the CCD reading unit 101, and for outputting a toner density detection image (to be described later) formed on the surface of the photosensitive body drum.

The optical motor controller 50 controls a driving operation of the optical motor 15 for reciprocating the original scanning unit.

An image processing operation and a mechanism operation in FIG. 1 will be described below.

A transfer sheet 63 fed by the pickup roller 32 or 33 is conveyed to the registration rollers 29 by the paper feed rollers 30 or 31, while being prevented from skewing. The transfer sheet 63 forms a predetermined amount of loop, and stands by until the scanning operation of an optical system is started and the sheet is wound around the transfer drum 27. The registration rollers 29 are then rotated, and the transfer sheet 63 is attracted on the transfer drum 27 by the attraction charger 21 and the attraction roller 28 serving as a counter electrode thereof. At substantially the same time, the optical system (original scanning unit) starts scanning, and an image read by the image pickup element is fetched by the image processing unit 49.

In the image processing unit 49, the image signal is color-separated, and the color-separated signals are subjected to various color correction processing operations, as described above. The image signals are converted into a laser beam by the laser modulation unit 205. The laser beam is deflected and scanned by the polygonal mirror 18 on the photosensitive body drum 19, and exposes the photosensitive body drum 19, which is uniformly charged by a charger (not shown), thereby forming a latent image.

The magenta toner developing machine 5d, the cyan toner developing machine 5c, the yellow toner developing machine 5b, and the black toner developing machine 5a are horizontally moved at predetermined timings, and perform developing processing of the latent image.

The toner image formed on the photosensitive body drum 19 is transferred onto the attracted transfer sheet 63 by the transfer charger 22. The series of operations are repeated by the number of necessary developing colors. Thereafter, the attraction force of the transfer drum 27 is weakened by the peeling chargers 23, thus performing an A- or B-side peeling operation. In this case, the high-voltage unit 24, which can prevent image disturbance due to peeling discharge upon peeling of the transfer sheet, applies a high voltage. After the toner images are fixed on the transfer sheet by a fixing roller 6a and a compression roller 6b, the transfer sheet is delivered onto an exhaust tray 6c.

Toner density detection in each developing machine, and toner density detection of a toner image formed on the photosensitive body drum 19 will be described below with reference to FIGS. 6 to 10.

Figure 6:
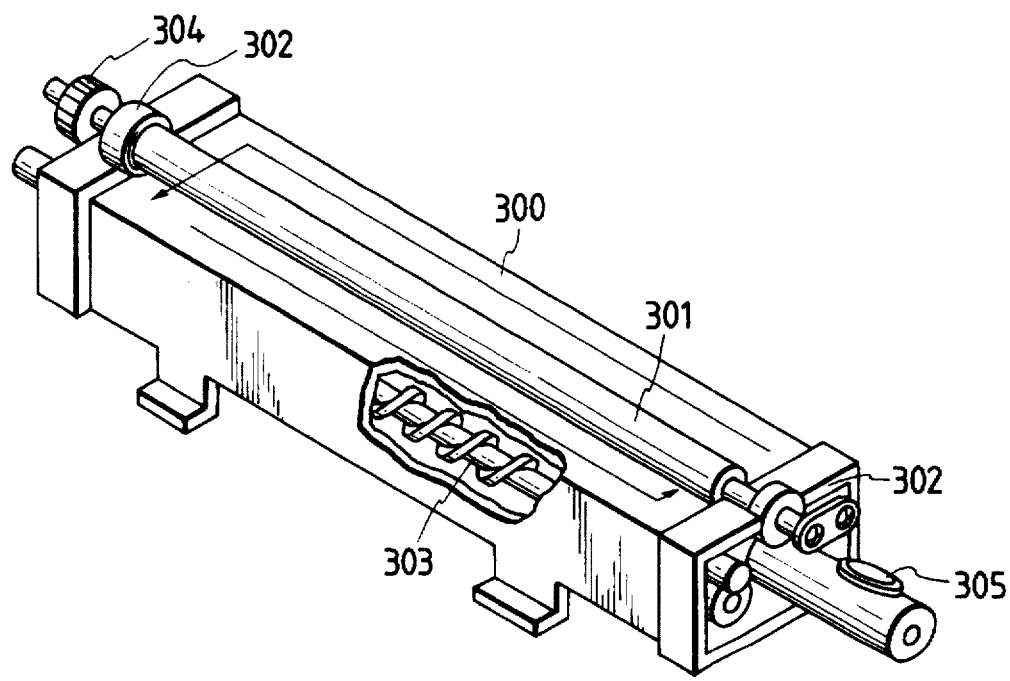
FIG. 6 is a perspective view of a developing machine.

FIG. 6 is a perspective view of the developing machine 5a, 5b, 5c, or 5d shown in FIG. 1. Toner hoppers H of the developing machines are arranged on the upper portion of the moving table (not shown) for the developing machines (FIG. 1). Each toner hopper H is prepared with a flexible supply coupling portion. Thus, a toner can be supplied wherever the developing machines are located. A toner supplied from the corresponding toner hopper H is supplied to a toner supply port 305, and is circulated in a direction of an arrow in FIG. 6 by two screws 303, which are rotated by the driving operation of a sleeve motor (not shown).

Toners used in this embodiment are yellow, magenta, cyan, and black toners, and a two-component developing method advantageous for color purity and transmission characteristics is adopted. The yellow, magenta, and cyan toners are formed by dispersing corresponding color materials using a polyester-based resin as a binder. The reflectance of these toners for near-infrared light (960 nm) is 80%.

On the other hand, the black toner uses a polyester-based resin as a binder, and carbon black as a coloring agent, and can effectively reduce running cost in a black monochrome copy mode. The reflectance of the black toner for near infrared light (960 nm) is 10% or less. The reflectance of the photosensitive body drum 19 for near-infrared light (960 nm) is about 40%. Note that the photosensitive body drum 19 comprises an OPC drum.

The magenta developing machine 5b, the cyan developing machine 5c, and the yellow developing machine 5d employ a method of optically detecting the toner density in the developing machine.

Figure 7:
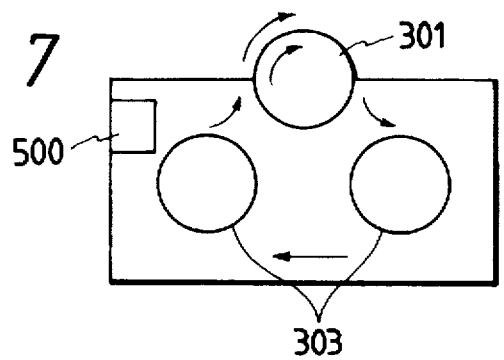
FIG. 7 is a sectional view of the developing machine.
Figure 8:
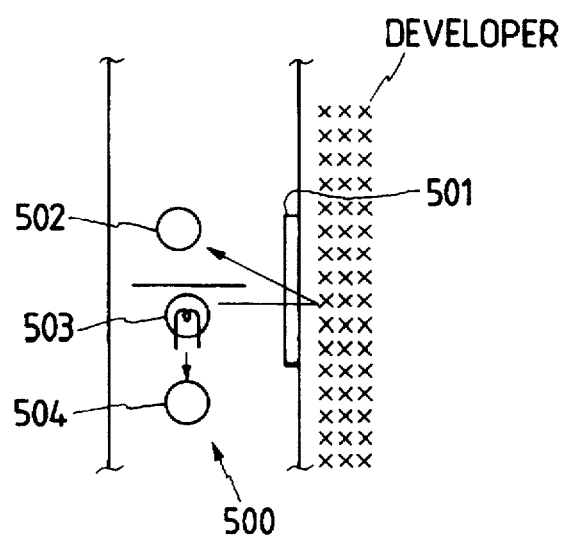
FIG. 8 is a view showing a density detection method in the developing machine.

FIG. 7 is a sectional view of the developing machine. In FIG. 7, the developing machine comprises a developing sleeve 301, and the screws 303. A toner density detection sensor 500 is arranged at a position illustrated in FIG. 7, and detects the toner density immediately before development. The toner density detection sensor 500 has an arrangement, as shown in FIG. 8, when the sensor 500 shown in FIG. 7 is viewed from the above. A detection window 501 is formed of a transparent member, and a side contacting a developer is covered with, e.g., a Teflon-based sheet having low surface energy so as to prevent attachment of a toner and a carrier. Light emitted from an auto toner regulator lamp (to be referred to as an ATR lamp hereinafter) 503 is reflected by the developer, and the reflected light is received by a light-receiving unit 502, thereby detecting the toner density. The spectral distribution of this lamp is selected depending on a toner agent. For example, an LED, having a spectral distribution within a wavelength range between 900 nm and 1,000 nm in which light reflected from a toner resin can be obtained, is used. A light-receiving unit 504 directly receives light emitted from the ATR lamp 503, and compares it with an initial state value of the ATR lamp 503 so as to correct the signal amount of the light-receiving unit 502, which amount is decreases due to aging.

More specifically, a service person sets developers maintained to have predetermined toner densities in the developing machines 5b, 5c, and 5d at the beginning of use of the apparatus or in adjustment thereof, and performs toner density detection operations of the developers maintained to have the predetermined toner densities. Data obtained by receiving reflected light from the developers at that time are stored as magenta data SGiM, cyan data SGiC, and yellow data SGiY in the RAM 44. At the same time, data obtained by directly receiving light from the ATR lamp 503 are stored as data RFiM, RFiC, and RFiY in the RAM 44. These six data SGiM, SGiC, SGiY, RFiM, RFiC, and RFiY are stored in a backed-up RAM area so as not to be destroyed after the power switch is turned off. Only magenta toner density control will be described below, and since cyan and yellow toner density control operations are the same as the magenta toner density control, a description thereof will be omitted.

Data read by the light-receiving unit 502 during image formation is represented by SGcM, and data read by the light-receiving unit 504 is represented by RFcM. When the toner density is decreased, a reflection signal from a developer is decreased, and a toner supply operation is performed. In this case, a toner supply time Tst for performing the toner supply operation is determined. The calculation formula of the time Tst is as follows. Note that K is a constant.

$$Tst=(SGiM-(RFiM/RFcM)\times SGcM)\times K$$

The supply operation is performed according to the toner supply time Tst determined in this manner, thus maintaining the initial toner density.

Figure 11:
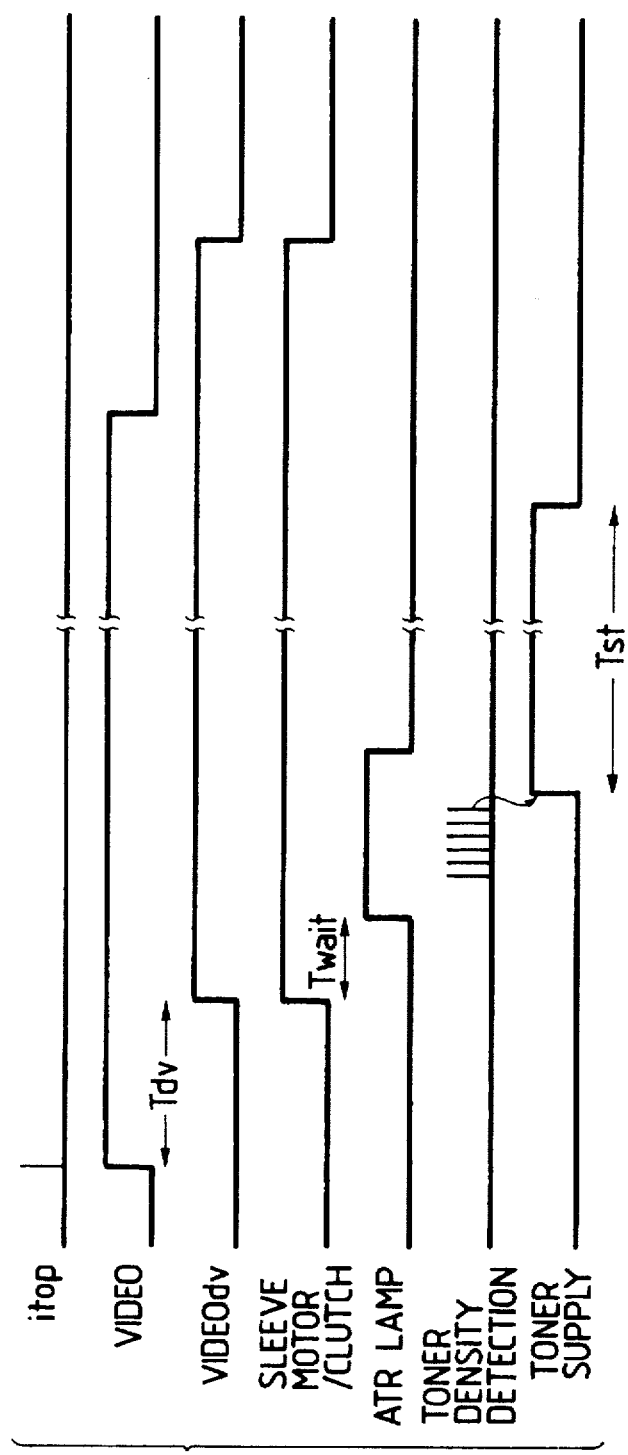
FIG. 11 is a timing chart showing the toner density detection timing in the developing machine.

FIG. 11 is a timing chart of the toner density detection operation. In synchronism with the leading end (the leading edge of VIDEOdv) of an electrostatic latent image at a developing position Ps (FIG. 9), the driving force of a sleeve motor (not shown) is transmitted through a sleeve clutch (not shown) corresponding to each developing color, and the screws 303 are rotated, thus performing a stirring operation in the developing machine. In order to eliminate the influence of the toner density in a still state, the ATR lamp 503 is turned on after an elapse of a short wait time (Twait), and the toner density detection operation is performed a plurality of number of times. Thereafter, the ATR lamp 503 is turned off, the toner supply amount is calculated, and the toner supply operation is then performed. Simultaneously with these toner density detection and toner supply operations, development is also performed, and the electrostatic latent image is developed by the developing machine.

Figure 9:
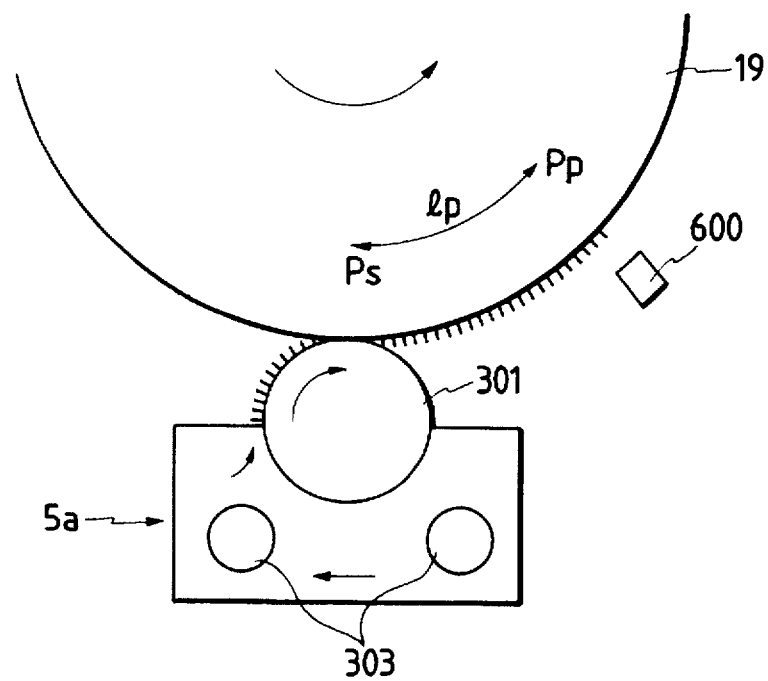
FIG. 9 is a view showing a photosensitive drum. and a toner density detection means arranged around the photosensitive drum.
Figure 10:
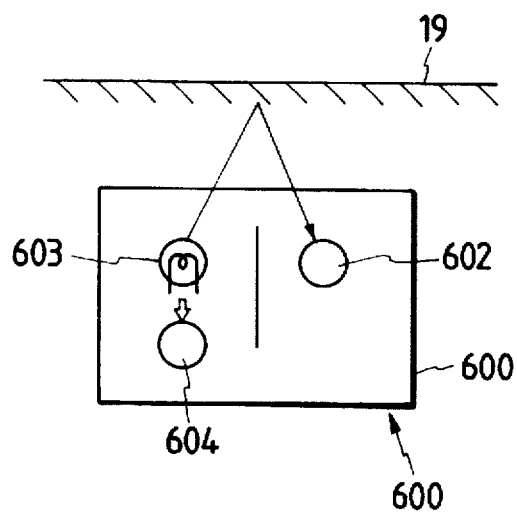
FIG. 10 is a sectional view of the toner density detection means.

FIG. 9 shows a state of development onto the photosensitive body 19 by the black developing machine 5a. A developed image is detected by a black toner density detection sensor 600 located at a position opposing a point Pp separated from the developing position Ps by a distance lp toward the downstream side. The black toner density detection sensor 600 comprises a light-emitting lamp 603, a light-receiving unit 604 for directly receiving light from the light-emitting lamp 603, and a light-receiving unit 602 for receiving light reflected by a toner image on the photosensitive body 19, as shown in FIG. 10, and can perform aging correction like in the toner density detection sensor 500.

More specifically, the principle of the black toner density control is the same as that of the above-mentioned magenta toner density control.

At the beginning of use of the apparatus or in adjustment thereof, a service person performs an output operation of a toner density detection image for a black developer maintained to have a predetermined toner density like in normal image formation, develops the output image, and then performs the toner density detection operation. At this time, data obtained by receiving light reflected by the photosensitive body 19 by the light-receiving unit 602, and data obtained by directly receiving light by the light-receiving unit 604 are respectively represented by SGiBk and RFiBk, and these data are stored in the backed-up area of the RAM 44. When the black toner density is decreased, the amount of light absorbed by a toner on the photosensitive body 19 is decreased, and finally, the amount of light reflected by the photosensitive body 19 is increased. Thus, the amount of light received by the light-receiving unit 602 is increased.

If data obtained by reading a black toner density detection toner image by the light-receiving unit 602 during image formation is represented by SGcBk, and data read by the light-receiving unit 604 at that time is represented by RFcBk, a toner supply time Tst is given by:

$$Tst=((RFiBk/RFcBk)\times SGcBk-SGiBk)\times K$$

(K is a proportionality constant)

Figure 12:
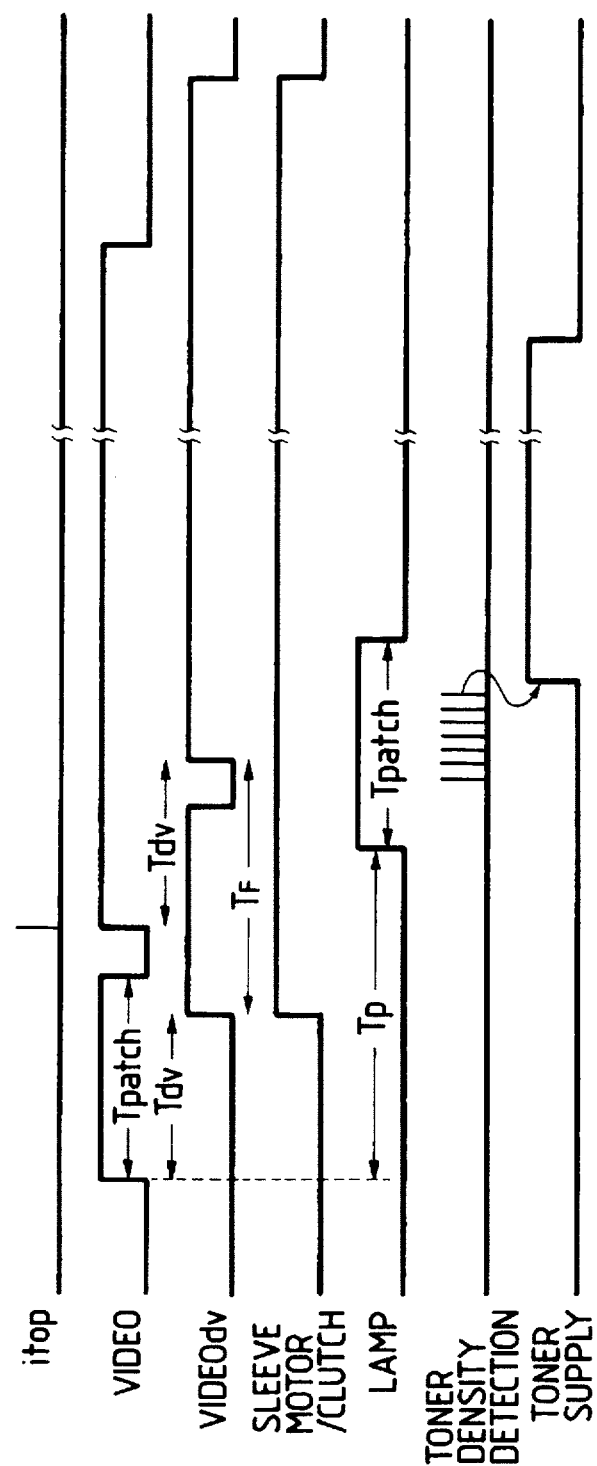
FIG. 12 is a timing chart showing the toner density detection timing on the photosensitive drum.

FIG. 12 is a timing chart of the black toner density detection operation.

Figure 5:
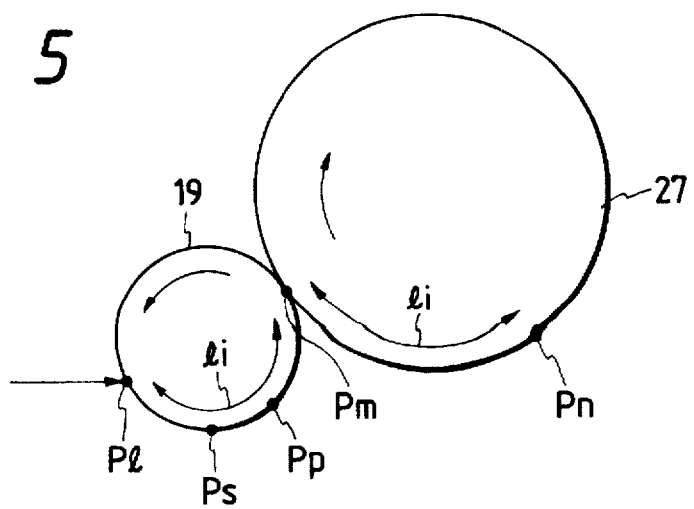
FIG. 5 is a view for explaining an output timing of a transfer timing signal.

In FIG. 12, a time required for moving the photosensitive drum 19 (FIG. 7) by a distance between Pl and Ps is represented by Tdv. A time required for moving the drum 19 by a distance between Pl and Pp in FIG. 5 is represented by Tp. An output time of the toner density detection image is represented by $T_{patch}$.

The axial range of the density detection toner image at that time on the photosensitive drum 19 can be sufficiently defined by the axial length of the black toner density detection sensor 600.

Since the density detection toner image formed in this manner reaches the detection position of the black toner density detection sensor 600 after the time Tp, the light-emitting lamp 603 is turned on, and toner density detection is performed. The CPU 42 determines a toner supply amount, and performs a supply operation from a black toner hopper (not shown) to the developing machine 5a, as needed. As for the spectral distribution of the light-emitting lamp 603, a wavelength range free from absorption by the photosensitive drum 19 is selected so as to prevent the photosensitive drum 19 from being deteriorated. In this case, an LED having a distribution of 900 nm to 1,000 nm is also used.

Figure 14:
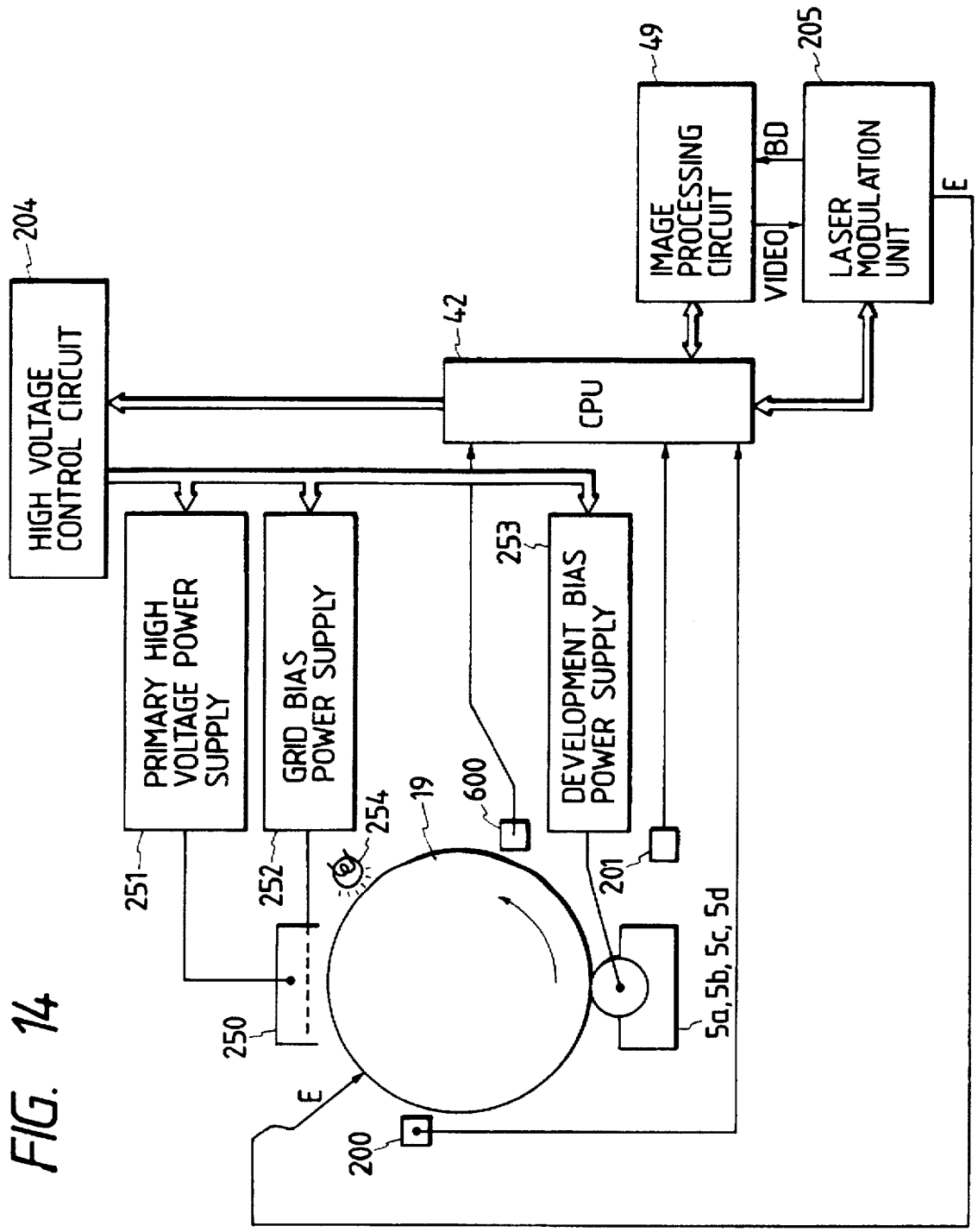
FIG. 14 is a block diagram showing an arrangement of a section for controlling image formation conditions.

A setting operation of image formation conditions in this embodiment will be described below with reference to FIG. 14. FIG. 14 illustrates sections necessary for the setting operation of image formation conditions in FIGS. 1 and 2.

In FIG. 14, the CPU 42 controls a primary high voltage power supply 251 for supplying a predetermined high voltage to the primary charger 250, a grid bias power supply 252 for supplying a predetermined bias voltage to a grid of the primary charger 250 for controlling a charging amount given to the photosensitive body drum 19 to a desired value, and a developing bias power supply 253 for applying a predetermined developing bias (normally obtained by superposing a DC voltage on an AC voltage) to the developing machine 5a, 5b, 5c, or 5d. A data signal associated with a humidity and temperature from an environment sensor 201 is input the CPU 42 through an A/D converter 203. An output signal from a potential sensor 200 for detecting the surface potential of the photosensitive body drum 19 is also input to the CPU 42 through the A/D converter 203. In addition, an output from the toner density sensor 600 for measuring the toner density on the surface of the photosensitive body drum 19 is input to the CPU 42 through the A/D converter 203.

The operation of the control system with the above-mentioned arrangement will be described below.

Figure 15:
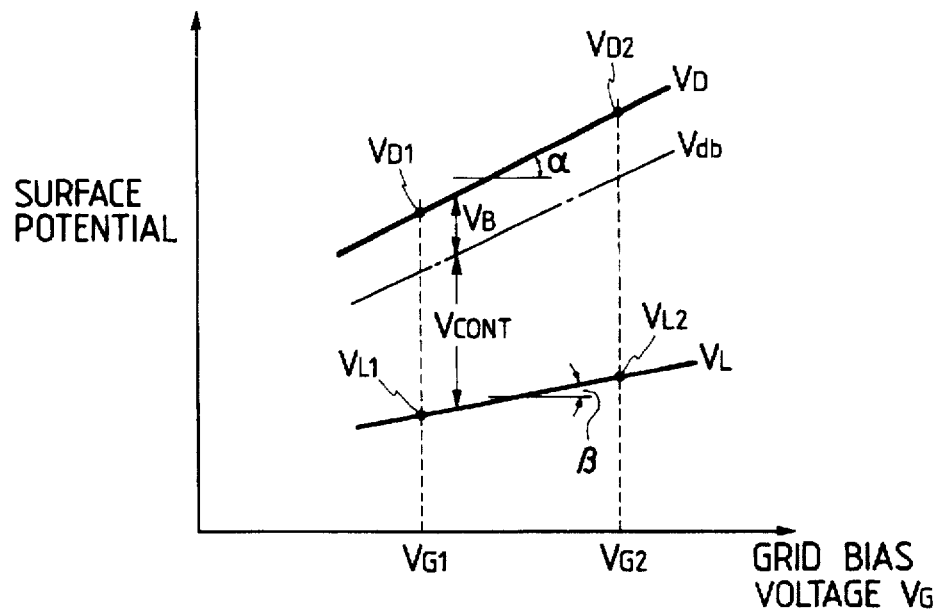
FIG. 15 is a graph showing the relationship between the surface potential and the grid bias voltage.

FIG. 15 is a graph showing the relationship between the grid bias voltage (abscissa) and the surface potential (ordinate) of the photosensitive body drum 19. In FIG. 15, a curve $V_D$ represents a surface potential when light is not radiated, and a curve $V_L$ represents a surface potential when light is radiated. As can be seen from FIG. 15, the surface potential $V_D$, i.e., a charging amount, is proportional to the grid bias voltage $V_G$ within a use range. The surface potential $V_L$ after light radiation has the same tendency. However, the rate of change with respect to the change amount of the grid bias voltage $V_G$, i.e., a proportionality coefficient of $V_D$ is larger than that of $V_L$ (as shown in FIG. 15, if the proportionality coefficient of $V_D$ is represented by $\alpha$, and the proportionality coefficient of $V_L$ is represented by $\beta$, a relation $\alpha > \beta$ is satisfied). Thus, prior to the image forming operation, the CPU 42 measures voltage values $V_D$ and $V_L$ at grid voltages $V_{G1}$ and $V_{G2}$ using the potential sensor 200, and predicts charging curves $V_D$ and $V_L$ with respect to a change in grid voltage on the basis of the measurement data, as shown in FIG. 15. Thereafter, when an image is actually formed, an image contrast $V_{CONT}$, i.e., a grid voltage at which the difference between a DC part of a developing bias (to be described later) and the surface potential $V_L$ after light radiation, or $V_D - V_L$ can become a predetermined value, is calculated by the CPU 42, and the grid bias power supply 252 is controlled according to the calculated value. Furthermore, the CPU 42 calculates a developing bias having a value lower than $V_D$ by a predetermined potential $V_B$ so as to prevent a toner from becoming attached to a portion corresponding to a blank portion (a portion corresponding to $V_D$ since this embodiment employs a reversal developing method) of an image, and controls the developing bias power supply 253 according to the calculated value.

Figure 16:
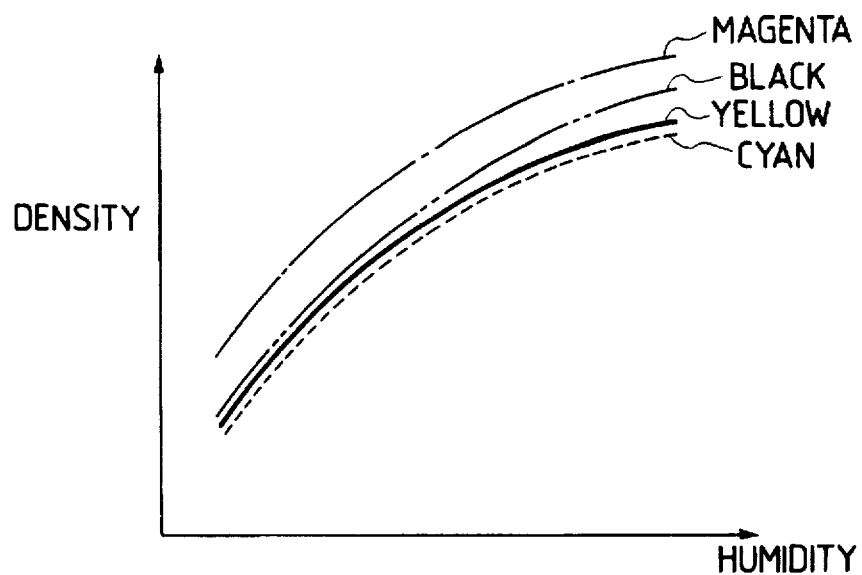
FIG. 16 is a graph showing the relationship between the humidity and the densities of developing colors.

FIG. 16 is a graph showing the influence of the humidity with respect to the image density when color images are printed under the same image formation conditions. As shown in FIG. 16, under the same image formation conditions, as the humidity is lower, the density is decreased. As the humidity is increased, the density is increased. Therefore, the humidity is detected, and a contrast potential $V_{CONT}$ corresponding to the detected humidity is calculated. When image formation conditions are set on the basis of the calculated potential, a stable image can be obtained irrespective of a variation in environmental conditions. As shown in FIG. 16, since a density change with respect to the humidity varies depending on a difference in color, if the image formation conditions are variably set in units of colors, a difference in image density due to a difference in color of a developer can be corrected.

Figure 17B:
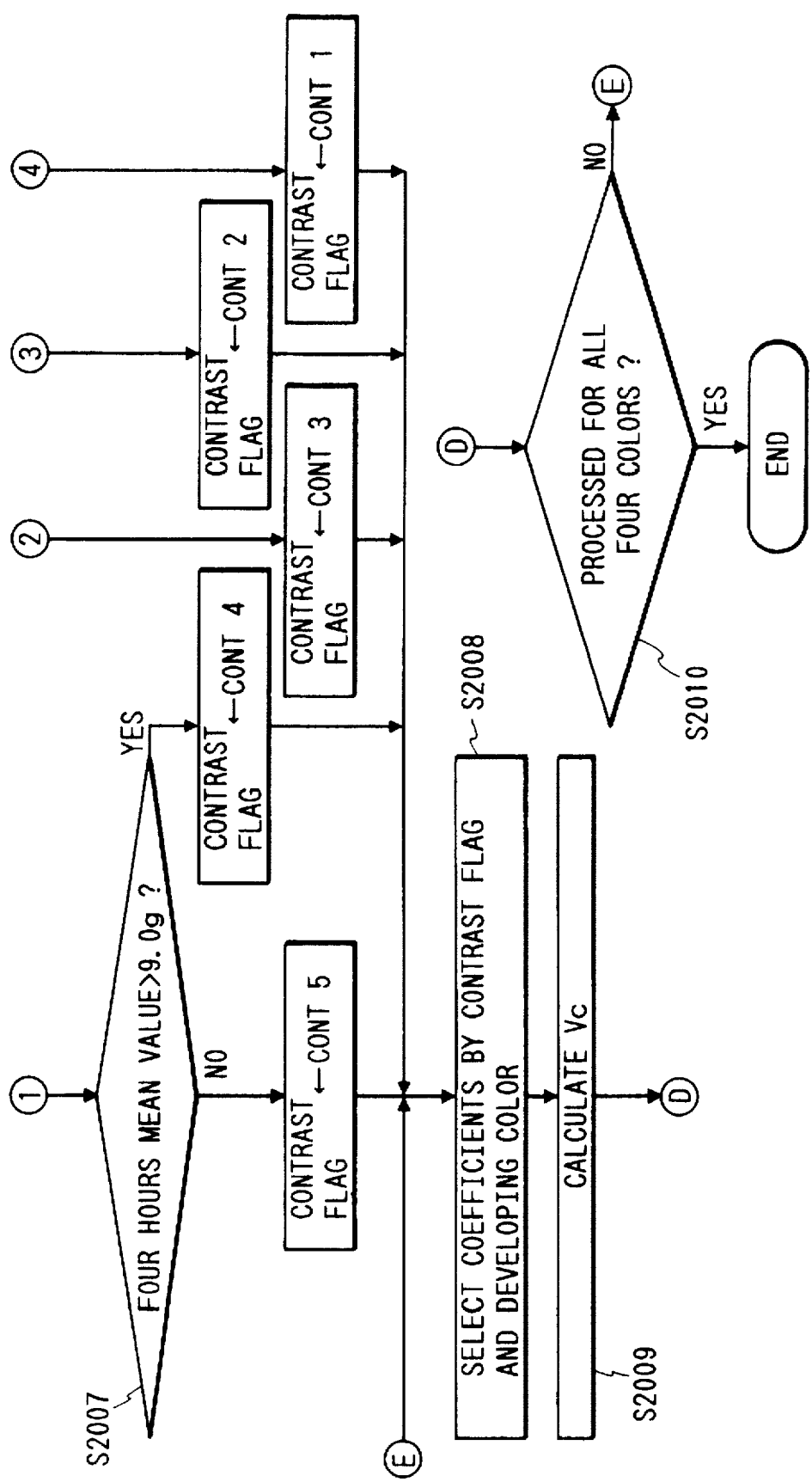
FIG. 17. consisting of FIGS. 17A and 17B. is a flow chart showing processing for obtaining an environmental contrast potential.

An operation for determining image formation conditions will be described in detail below with reference to the flow chart shown in FIG. 17. In a process A shown in FIG. 17, an optimal environmental contrast potential $V_C$ at the present time is calculated in consideration of an environmental history so far. The process A is automatically executed when new environment data is received from the environment sensor 201 in a state other than an image forming operation, and always calculates the environmental contrast potential $V_C$ using the latest environmental history.

Data from the environment sensor 201 including a temperature sensor and a humidity sensor are measured once at 30-minute intervals or a plurality of number of times within 30 minutes, and an average or mean value of the measurement data for eight hours is stored in a memory (RAM 44). When another 30 minutes elapse, the oldest data is removed, and data for the latest eight hours are stored. When there is no previous data since the CPU 42 is just operated, e.g., at a time of power-on (S2001), present environment data is stored in a memory as data for eight hours (S2002). A mixing ratio of water (absolute humidity) is calculated based on the environment data for eight hours using a predetermined equation, and is stored in the RAM 44. Average values x, y, and z of the mixing ratios (absolute humidities) of the last two hours, four hours, and eight hours are calculated based on the environment data for eight hours (block S2003). These average values x, y, and z are used in the following conditional decisions, and are also used as a variable H upon calculation of the contrast potential (to be described later). In decision block S2004, it is checked if two hours average value x is larger than a mixing ratio of 16.5 g. If YES in block S2004, a contrast flag is set to be CONT1. This indicates that a high-humidity state continued over two hours. It is then checked in decision block S2005 if the present value w is larger than 16.5 g. If YES in block S2005, the contrast flag is set to be CONT2. This indicates that a low-humidity state continued for two hours, but the humidity is changing to a high-humidity state. It is then checked in decision block S2006 if the average value z for eight hours is larger than 9 g. If YES in block S2006, the contrast flag is set to be CONT3. This indicates that the humidity has been in a middle-humidity state over eight hours. It is checked in decision block S2007 if the average value y for four hours is larger than 9 g. If YES in block S2007, the contrast flag is set to be CONT4. This indicates that the humidity is changing from a low-humidity state to a middle-humidity state. In a case other than the above-mentioned cases, i.e., if the average value y for four hours is equal to or smaller than 9 g, a low-humidity state is determined, and the contrast flag is set to be CONT5.

The above-mentioned processing is performed since a toner has different moisture absorption/exhaust speeds as between a case wherein the humidity changes from a low-humidity state to a high-humidity state, and a case wherein the humidity changes from a high-humidity state to a low-humidity state. More specifically, the image density is proportional to the absolute humidity. However, since the image density is determined not by the environmental humidity but by the amount of moisture absorbed in a toner, the above-mentioned conditions decisions are made.

In block S2008, the variable H for a contrast calculation is determined based on the contrast flag. For example, when the contrast flag is CONT1, since a toner is completely moisture-conditioned to a high-humidity state, the variable H is set to be the average value x for two hours. When the contrast flag is CONT2, since an intermediate state between the high- and low-humidity states is attained, the variable H is set to be (x+w)/2 as an average value of the average value x for two hours and the present value w.

A general formula of the contrast potential calculation is:

$$V_C = aH + b$$

where $V_C$ is the environmental contrast potential, a and b are coefficients, and H is the above-mentioned variable. Table 1 below is a partial list of the variable H and the coefficients a and b corresponding to the contrast flags (CONT1, CONT2, CONT3, . . . ), and developing colors (magenta M, cyan C, yellow Y, and black Bk). This content can be stored in the ROM 43, and a selection method of the coefficients a and b, and the variable H can be retrieved based on the contrast flag and developing color information (block S2008). The environmental contrast potential $V_C$ is calculated based on this retrieval result (block S2009).

This operation is repeated for four colors (S2010), thereby determining environmental contrast potentials $V_C(M)$, $V_C(C)$, $V_C(Y)$, and $V_C(Bk)$ for the magenta, cyan, yellow, and black toners.

TABLE 1

| Contrast Flag | Developing Color | H | a | b |
|---|---|---|---|---|
| CONT1 | M | x | $a_{1M}$ | $b_{1M}$ |
|  | C | x | $a_{1C}$ | $b_{1C}$ |
|  | Y | x | $a_{1Y}$ | $b_{1Y}$ |
|  | Bk | x | $a_{1Bk}$ | $b_{1Bk}$ |
| CONT2 | M | (x + w)/2 | $a_{2M}$ | $b_{2M}$ |
|  | C | (x + w)/2 | $a_{2C}$ | $b_{2C}$ |
|  | Y | (x + w)/2 | $a_{2Y}$ | $b_{2Y}$ |
|  | Bk | (x + w)/2 | $a_{2Bk}$ | $b_{2Bk}$ |
| . | . | . | . | . |
| . | . | . | . | . |
| . | . | . | . | . |

FIG. 18 is a graph obtained by plotting the above equation. As shown in FIG. 18, since coefficients are changed in units of colors, a difference in density change in units of colors shown in FIG. 16 can be absorbed and corrected.

A process B will be described below with reference to FIGS. 14 and 19. In the process B, the relationship between the grid bias voltage $V_G$ and the surface potential $V_S$ shown in FIG. 15 is measured respectively at a laser ON timing and a laser OFF timing.

In this embodiment, since the image signal VIDEO to the laser modulation unit 205 is an 8-bit signal, it means $VIDEO_P=00_H$ at the laser OFF timing, and means $VIDEO_P=FF_H$ at the laser ON timing. In this processing, control is made to perform a latent image forming operation but not to perform developing and transfer operations.

The CPU 42 rotates the photosensitive body 19 in the same manner as in a normal image formation sequence, and turns on the primary high voltage power supply 251. The CPU 42 then sets the high voltage control circuit 204 to output a grid bias $V_G=V_{G1}$, thereby outputting the grid bias $V_G=V_{G1}$ (S1100). Thereafter, the CPU 42 sets the pattern generation unit 113 (FIG. 13) to output a pattern corresponding to laser OFF data $VIDEO_P=00_H$ as an image signal $VIDEO_P$, thereby creating a laser OFF state. Since the primary high voltage application position, the laser exposure position, and the potential measurement position on the photosensitive body 19 are different from each other in the respective states, their positional relationship is considered in the control, as a matter of course.

When a latent image in the laser OFF state reaches the position of the potential sensor 200 at the grid bias $V_G=V_{G1}$, a surface potential $V_{D1}$ of the photosensitive body 19 is measured, and is stored in the memory (RAM 44) (S1101). In order to create a laser ON state without changing the grid bias potential $V_G$, the CPU sets the pattern generation unit 113 to have laser ON data $VIDEO_P=FF_H$, and turns on the laser, thereby radiating the photosensitive body 19 in maximum luminance energy. A surface potential $V_{L1}$ after laser radiation is measured, and is stored in the memory (block S1102). In order to measure $V_{D2}$ and $V_{L2}$ in FIG. 15, a grid bias from the grid bias power supply 252 is set to be another predetermined value $V_{G2}$ (block S1103). $V_{L2}$ is similarly measured, and is stored in the memory (block S1104). In order to measure $V_{D2}$, the laser is turned off. $V_{D2}$ is measured, and is stored in the memory (block S1105). The primary high voltage power supply 251 and the grid bias power supply 252 are turned off, thus ending the operation.

Note that the laser ON/OFF order and the output timings of the grid bias voltages $V_{G1}$ and $V_{G2}$ may be changed for the sake of convenience of a sequence. In this embodiment, the potentials at the laser ON and OFF timings are measured. The process A and the process B are independent from each other, and either process may be executed earlier.

A process C will be described below with reference to FIG. 20. Note that the process C must be executed after the processes A and B are performed.

In the process C, an optimal grid voltage $V_G$ and a developing bias DC part $V_{db}$ for each toner color are calculated basically using, as a contrast potential, the environmental contrast potential $V_C$, which is obtained in the process A, and takes the environmental history into consideration.

For this reason, in the following description, assume that the contrast potential $V_{CONT}$=the environmental contrast potential $V_C$.

The inclinations $\alpha$ and $\beta$ of the charging curves $V_D$ and $V_L$ (FIG. 15), and $\alpha$–$\beta$ are calculated using the following equations using $V_{G1}$ and $V_{G2}$, and measurement data $V_{D1}$, $V_{D2}$, $V_{L1}$, and $V_{L2}$ (block S1200).

$$\alpha=(V_{D2}-V_{D1})/(V_{G2}-V_{G1})$$

$$\beta=(V_{L2}-V_{L1})/(V_{G2}-V_{G1})$$

The above-mentioned fog removing voltage $V_B$ and the environmental contrast voltage $V_C$ calculated in the process A are read out from the buffer area of the memory, and the contrast potential $V_{CONT}$ is set (block S1201). The grid bias voltage $V_G$ is determined to be a voltage capable of obtaining a sum of $V_{CONT}$ and $V_B$. More specifically, the following calculation is made (block S1202):

$$V_G=(V_{CONT}+V_B-(V_{D1}-V_{L1}))/(\alpha-\beta)+V_{G1}$$

When the grid bias voltage is calculated by the above equation, $V_D$ is then calculated (block S1203):

$$V_D=\alpha(V_G-V_{G1})+V_{D1}$$

Furthermore, in block S1204, a developing bias DC part $V_{db}$ is calculated:

$$V_{db}=V_D-V_B$$

If it is determined that the above-mentioned processing is completed for four colors (decision block S1205), the processing is ended.

With the above-mentioned processing, the grid bias control values $V_G$ and the developing bias control values $V_{db}$ are obtained for four colors, i.e., magenta, cyan, yellow, and black.

Since the grid bias and developing bias obtained in this manner consider environmental conditions, and also consider a difference in each color with respect to environmental conditions, a very stable image having a proper density can be obtained.

Output density stable control as the principal object of the present invention will be described below.

The output density stable control can be roughly classified into high density output stable control, middle density output stable control, and low density output stable control.

Also, correction control of a detection error of a toner density due to a stained sensor detection window, and potential deflection confirmation control of the photosensitive body are performed so as to execute precise output density stable control.

A summary of the output density stable control will be given below.

In the output density stable control, color toner images, which are sequentially formed to have a constant density under predetermined image formation conditions, are sequentially read using the black toner density detection sensor 600, and feedback control is made to image formation conditions for each color according to the read data.

For this purpose, the sensor window stain correction control of the black toner density detection sensor 600 and the potential deflection confirmation control of the photosensitive body are required.

(Sensor Window Stain Correction Control)

Prior to the above-mentioned operation for storing an initial black toner density, the black toner density detection sensor 600 is operated to detect the density of the photosensitive body drum 19 with no toner attached.

The output from the sensor 600 is adjusted using an adjusting function (not shown), so that data read by the light-receiving unit 602 at that time becomes a predetermined value $SG_{idrm}$ or a value close to it, and data from the light-receiving unit 604 at that time is backed up as data $RF_{idrm}$.

Thereafter, when data read by the light-receiving units 602 and 604 upon another detection of the photosensitive body 19 with no toner are respectively represented by $SG_{cdrm}$ and $RF_{cdrm}$, if $SG_{cdrm} \times RF_{idrm}/RF_{cdrm}$ is different from $SG_{icdrm}$, it is considered that the window 501 of the black toner density detection sensor 600 is stained with a toner. For this reason, a correction value $D_{crct}$ for this window stain is calculated using the following equation:

$$D_{crct} = SG_{idrm}/(SG_{cdrm} \times RF_{idrm}/RF_{cdrm})$$

This value is multiplied with data read by the light-receiving unit 602 of the black toner density detection sensor 600, thereby correcting the read data.

Figure 21:
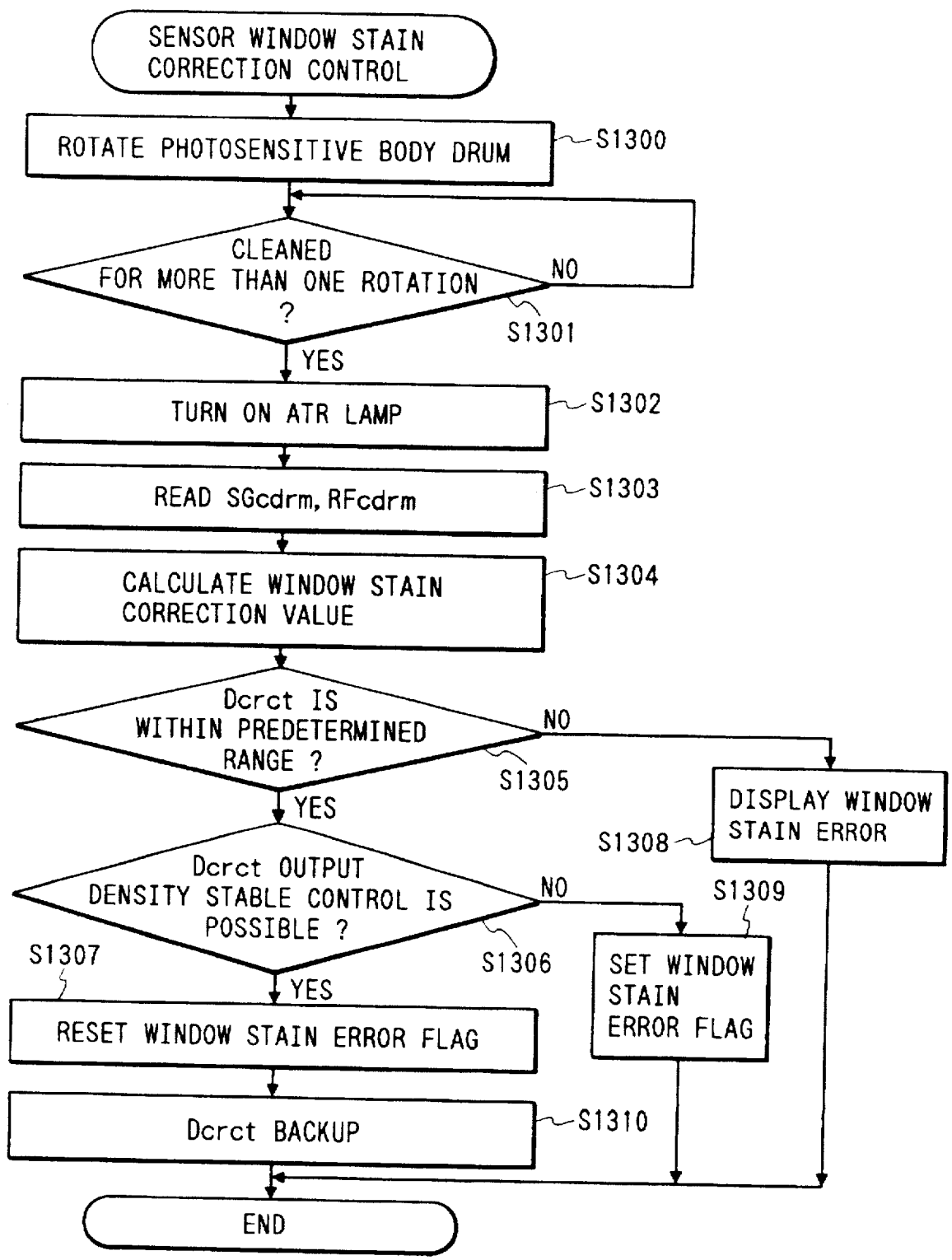
FIG. 21 is a flow chart showing sensor window stain correction control.

The sensor window stain correction control will be described below with reference to the flow chart shown in FIG. 21.

In order to obtain the sensor window stain correction value $D_{crct}$, a surface with no toner on the photosensitive body drum is required. Thus, the photosensitive body drum 19 is rotated for cleaning (S1300). The photosensitive body drum 19 is cleaned by the cleaner 20 for more than one rotation, and the control waits until the cleaned surface reaches a position opposing the black toner density detection sensor 600 (S1301). Thereafter, the ATR lamp 603 is turned on (S1302), and data from the photosensitive body drum surface with no toner is read. Data read by the light-receiving unit 602 at that time is stored as $SG_{cdrm}$ in the RAM 44, and at the same time, data read by the light-receiving unit 604 is stored as $RF_{cdrm}$ in the RAM 44 (S1303).

Then, the above-mentioned window stain correction value $D_{crct}$ is calculated (S1304).

When the window stain correction value $D_{crct}$ cannot fall within a predetermined range (S1305) (e.g., less than 60% or more than 200%), it is determined that a window stain is considerable, and a window stain error message is displayed (S1308), thus inhibiting the following image forming operation.

Even when the window stain correction value $D_{crct}$ falls within the predetermined range, if the window is too stained for use in output density stable control (to be described later) (e.g., less than 70% or more than 150%), a window error flag is set (S1309), and the operation is ended. In contrast to this,
when the window is not stained, the window stain error flag is reset (S1307), and the window stain correction value $D_{crct}$ is stored in the backup area of the RAM 44 (S1310), thus ending the operation.

(Potential Deflection Confirmation Control)

In the potential deflection confirmation control, a laser beam of a predetermined luminance energy is continuously radiated on the surface of the rotating photosensitive drum 19, and the radiated position is continuously measured by the potential sensor 200. Thus, surface potential nonuniformity on the photosensitive drum 19 is detected, thereby determining whether the photosensitive drum 19 can be used in an image forming operation or in output density stable control (to be described later).

Figure 22:
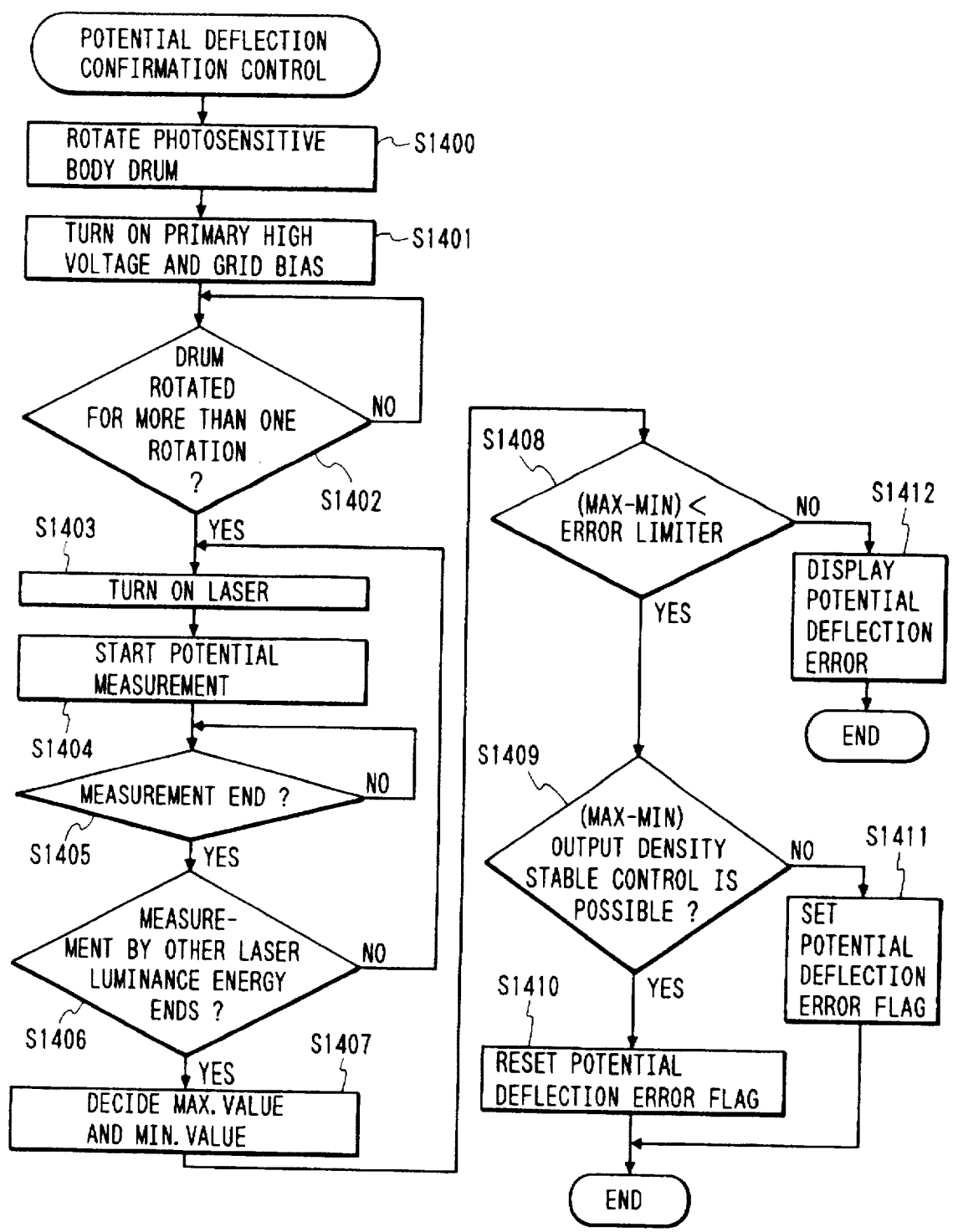
FIG. 22 is a flow chart showing potential deflection confirmation control.

This control will be described below with reference to the flow chart shown in FIG. 22.

In order to start control, a motor (not shown) is rotated to rotate the photosensitive drum 19, and the pre-exposure lamp 254 is turned on (S1400). Thereafter, the primary high voltage power supply 251, and the grid bias power supply 252 are turned on through the high voltage control circuit 204 (S1401). In order to ensure electrical cleaning of the photosensitive drum 19 by the pre-exposure lamp 254, the control waits until the photosensitive drum 19 is rotated for more than one rotation (S1402). Thereafter, the pattern generation unit 113 in the image processing unit 49 is set to radiate a laser beam of a predetermined luminance energy (e.g., $VIDEO_F=20_H$) onto the photosensitive drum 19, and the laser is turned on (S1403).

Thereafter, the potential is continuously measured by the potential sensor 200 for one rotation of the photosensitive drum 19 (S1404), and measurement data are stored in the RAM 44. When potential deflection confirmation control is repeated using another laser luminance energy upon completion of measurement for one rotation (S1405), steps S1403 to S1405 are repeated (S1406).

In this embodiment, in order to eliminate a measurement error due to the laser luminance energy factor, measurement is performed twice using $VIDEO=20_H$ and $70_H$. Sample laser luminance energy can be increased/decreased as needed.

Upon completion of the measurement, the maximum and minimum values of the measurement data stored in the RAM 44 are determined (S1407). When the difference between the maximum and minimum values is so large as to influence an image forming operation (e.g., 40 V) (S1408), a potential deflection error is displayed on the operation unit 51 (S1412), thus inhibiting the following image forming operation.

Even when the difference between the maximum and minimum values is smaller than an error limiter value, if it is determined that the measured potential cannot be used in the output density stable control to be described later (e.g., 20 V) (S1409), a potential deflection error flag is set (S1411), and the processing is ended.

On the contrary, when it is determined that the measured potential can be used in the output density stable control, the potential deflection error flag is reset (S1410), and the processing is ended.

(Output Density Stable Control)

Prior to the description of the output density stable control, the relationship between the black toner density detection sensor 600 and the toner density of a toner attached to the photosensitive body drum 19 will be explained below with reference to FIG. 23.

Figure 23:
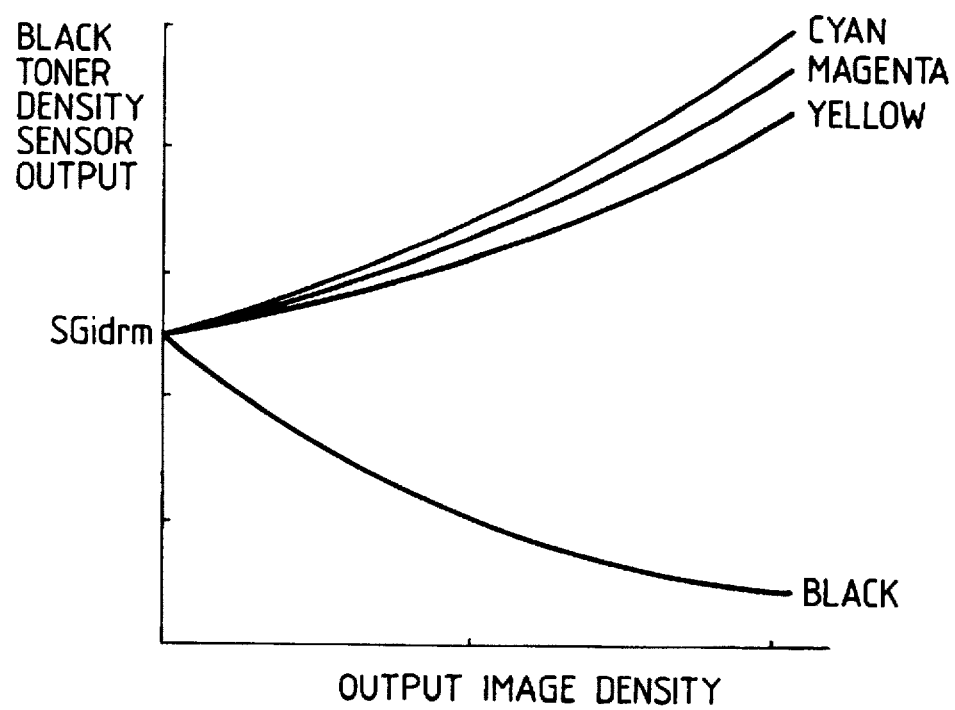
FIG. 23 is a graph showing the relationship between the output from a black toner density sensor. and the densities of developing colors.

FIG. 23 shows the relationship between the output image density and the output from the black toner density detection sensor 600.

The output from the black toner density detection sensor 600 is adjusted before the above-mentioned black toner initial density storage operation, so that the output value from the sensor 600 for detecting the photosensitive body drum 19 with no toner becomes $SG_{idrm}$.

As can be seen from FIG. 23, as for the yellow, magenta, and cyan color toners, as the area coverage factor is increased and the output image density is increased, the reflected luminance energy is increased as compared to that of the photosensitive body drum 19 itself, and the output from the sensor 600 is increased. On the other hand, as for the black toner, as the area coverage factor is increased and the output image density is increased, the reflected luminance energy is decreased as compared to that of the photosensitive body drum 19 itself, and the output from the sensor 600 is decreased.

By utilizing these relationships, an output image density can be precisely calculated from the sensor output even using toners having different reflection characteristics without transferring and fixing the toners onto a copy sheet.

Figure 24:
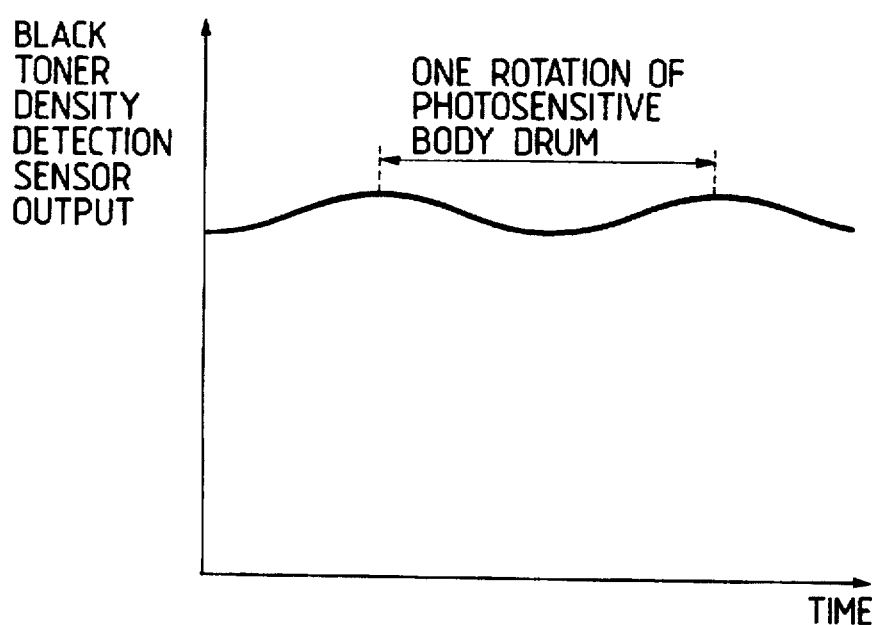
FIG. 24 is a graph showing measurement data due to eccentricity for one rotation of the photosensitive body drum.

FIG. 24 shows a state wherein the magenta toner having a given density is applied to the entire surface of the photosensitive body drum 19, and measurement is performed by the black toner density detection sensor 600 while rotating the drum 19. FIG. 24 demonstrates that an input signal having an identical level is vertically deflected at a cycle of one rotation of the photosensitive body drum 19 due to the eccentricity of the drum 19. Therefore, in order to eliminate a signal error due to the eccentricity, density measurement in the following output image stable control performs a calculation using an average value of data for one rotation of the drum or an average value of data at two points opposed 180° to each other.

Figure 25:
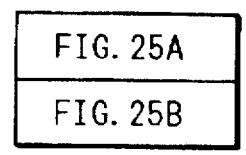
FIG. 25. consists of FIGS. 25A and 25B. is a flow chart showing high density output stable control processing.
Figure 25A:
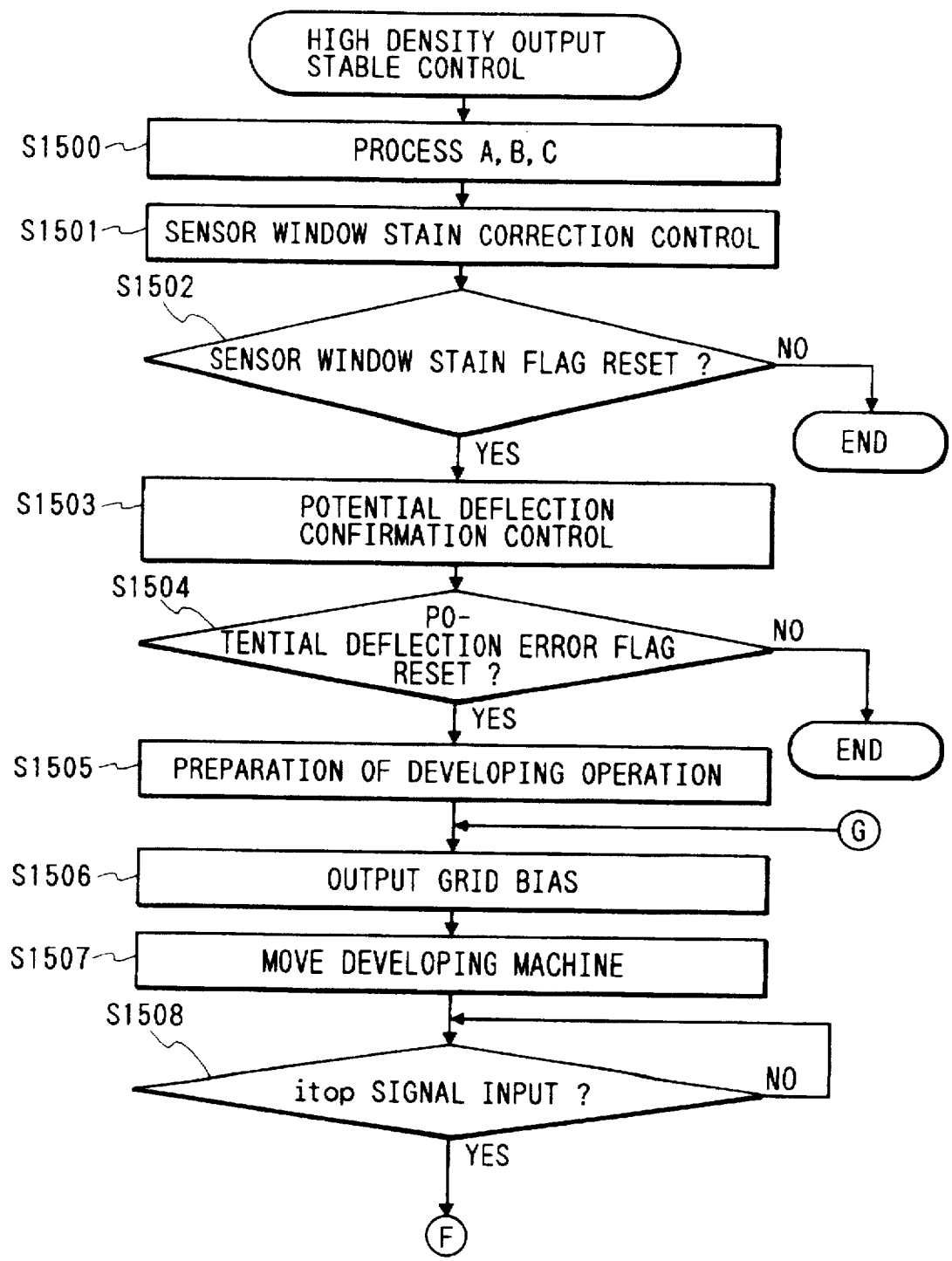
Figure 25B:
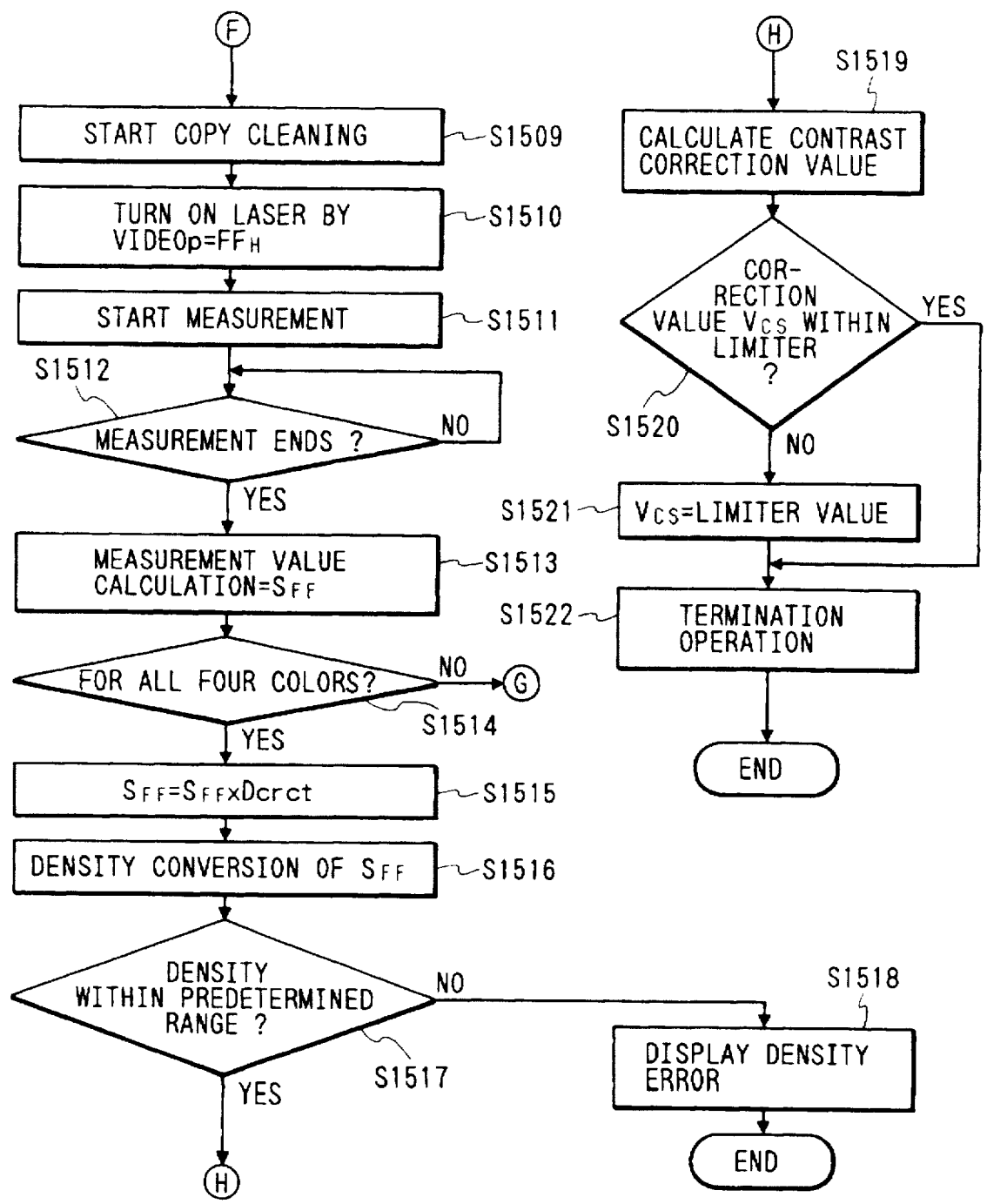
Figure 26:
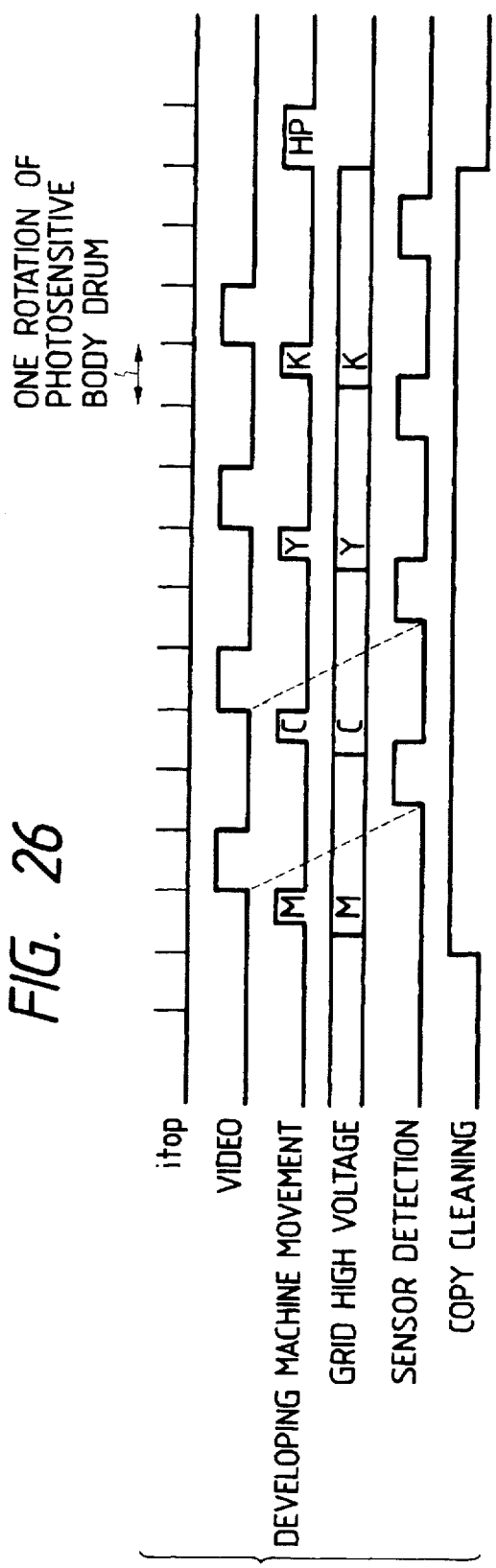
FIG. 26 is a timing chart showing a processing timing of the high density output stable control.

The high density output stable control will be described below with reference to FIGS. 25 to 27.

In order to preform this processing, the above-mentioned process A, process B, and process C are executed to stabilize an output image (S1500). In this case, in the process C, a calculation is made using the environmental contrast $V_C$ obtained in the process A as the contrast potential $V_{CONT}$ for each developing color. Then, the above-mentioned sensor window stain correction control is performed (S1501) to obtain the window stain correction value $D_{crcr}$. The sensor window stain flag is then checked to determine if the output density stable control can be executed (S1502). The above-mentioned potential deflection confirmation control is executed (S1503), and the potential deflection error flag is checked to determine if the output density stable control can be executed (S1504).

Since the output density stable control to be executed below includes a developing operation, rotation of the photosensitive body drum 19, and various I/O setting operations necessary for the developing operation are performed (S1505).

Assuming that this control is performed in the order of magenta, cyan, yellow, and black developing colors, a grid bias value obtained in the process C and corresponding to a developing color is read out from the RAM 44, and is set in a high voltage control circuit 204, thereby outputting a primary high voltage grid bias (S1506).

A developing machine of a color to be developed is moved to the developing position (S1507). At this time, a developing DC bias $V_{db}$ obtained in the process C and corresponding to the developing color is output. Thereafter, in order to eliminate a measurement error due to the drum eccentricity described above, the control waits for the timing signal ITOP for one rotation of the photosensitive body drum 19 (S1508). After the signal ITOP is input, the transfer drum is cleaned (S1509). This is to prevent a transfer sheet 27a (FIG. 1) from being stained when the transfer drum 27 is stained with a toner. A transfer cleaning external brush unit including a transfer cleaning fur brush 261 is brought into contact with the transfer drum 27, and an inner brush 262 is backed up from the inner side. In this state, when the transfer drum 27 is rotated, and the transfer cleaning fur brush 261 is rotated, a transfer cleaning operation is performed.

As a measurement image, output image data is set in the pattern generation unit 113 in the image processing unit 49 to have $VIDEO_P = FF_H$. In this case, image data other than an image necessary for measurement may be prevented from being output by utilizing the trimming processing unit 108 (S1510).

Thereafter, the black toner density detection sensor 600 starts density measurement of a measurement image at a given timing (S1511). The measured data are corrected by a change over time in output from the ATR lamp 503, and corrected data are sequentially stored in the RAM 44 at predetermined time intervals. Upon completion of the measurement for one rotation of the photosensitive body drum 19 (S1512), the density data stored in the RAM 44 are read out, and an average value $S_{FF}$ is calculated. The average value $S_{FF}$ is data from which an eccentricity factor of the photosensitive body drum is removed (S1513).

The above-mentioned operations are repeated for four colors (S1514) to obtain average values $S_{FF}$ for four colors.

Each average value $S_{FF}$ is multiplied with the sensor window stain correction value $D_{crcr}$ thereby performing window stain correction (S1515). A conversion table of the ROM 43, which stores the relationship shown in FIG. 23, is accessed to convert the corrected average value $S_{FF}$ into density data $D_{FF}$ (S1516). When the difference between ideal density data $D_{FF}$ and the measurement density data $D_{FF}$ cannot fall within a predetermined range (S1517), it is determined that a trouble associated with, e.g., a high voltage system, occurred. Thus, the following image forming operation is inhibited, and a density error message is displayed (S1518).

Figure 27:
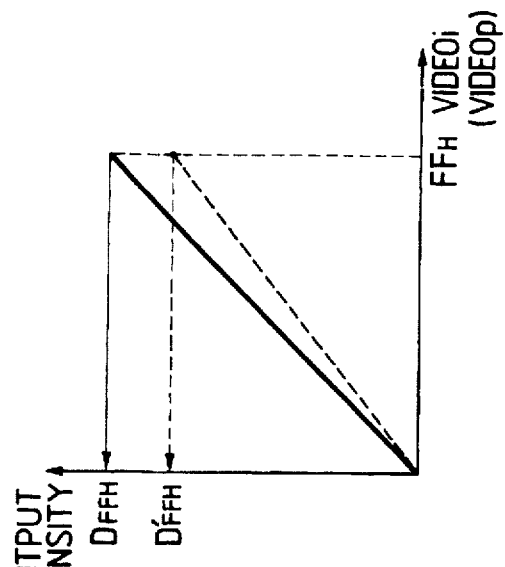
FIG. 27 is a graph showing the relationship between the image signal set in a pattern generation unit, and the output density.

FIG. 27 shows the image signal $VIDEO_P$ set in the pattern generation unit 113, the output density $DFF_H$ and the ideal output density $D_{FFH}$. Since the contrast potential $V_{CONT}$ during this operation is the environmental contrast potential $V_C$ obtained in the process A, the potential $V_{CONT}$ cannot coincide with an ideal environmental contrast potential due to, e.g., a change in characteristics of the photosensitive body drum caused by a temperature rise in the apparatus, and the output density in a high-density region becomes different from the ideal value $D_{FF}$.

Therefore, in this embodiment, the contrast potential $V_{CONT}$ is corrected, so that the output density value $D_{FFH}$ can approach the ideal value $D_{FF}$. If a contrast correction value of the environmental contrast $V_C$ is represented by $V_{CS}$, it is given by (S1519):

$$V_{CS} = V_C \times (D_{FFH} - D_{FFH})/(D_{FFH})$$

In addition, feedback control may be made for a laser output power, a current to the primary charger, or an original exposure amount.

If the calculated correction value $V_{CS}$ is too large, an excessive operation may be performed. Thus, when the correction value cannot fall within a limiter range (e.g., 20% of the calculated environmental contrast potential $V_C$) (S1520), a limit value is set in the correction value $V_{CS}$ (S1521). Thereafter, the rotating transfer cleaning device, the laser, the photosensitive body drum 19, and the high voltage power supply are turned off (S1522), thus ending the operation. The correction contrast potential $V_{CS}$ for each developing color is stored in the backup RAM area, where data is not broken after power-off, together with date data in the timer 206. This data is utilized when the control history is confirmed.

(Low Density Output Stable Control)

Figures 28, 28A:
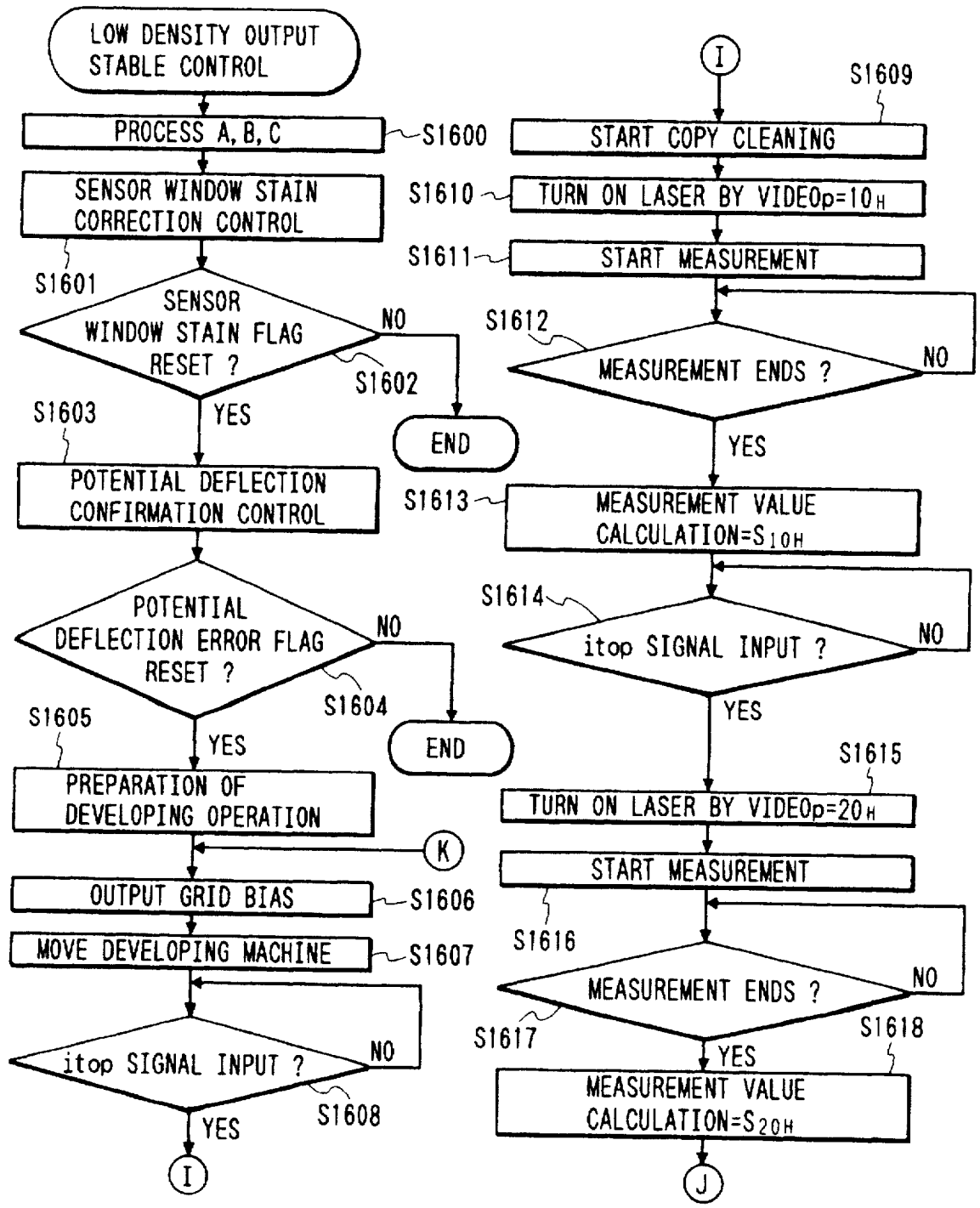
FIG. 28. consisting of FIGS. 28A and 28B. is a flow chart showing low density output stable control processing.
Figure 28B:
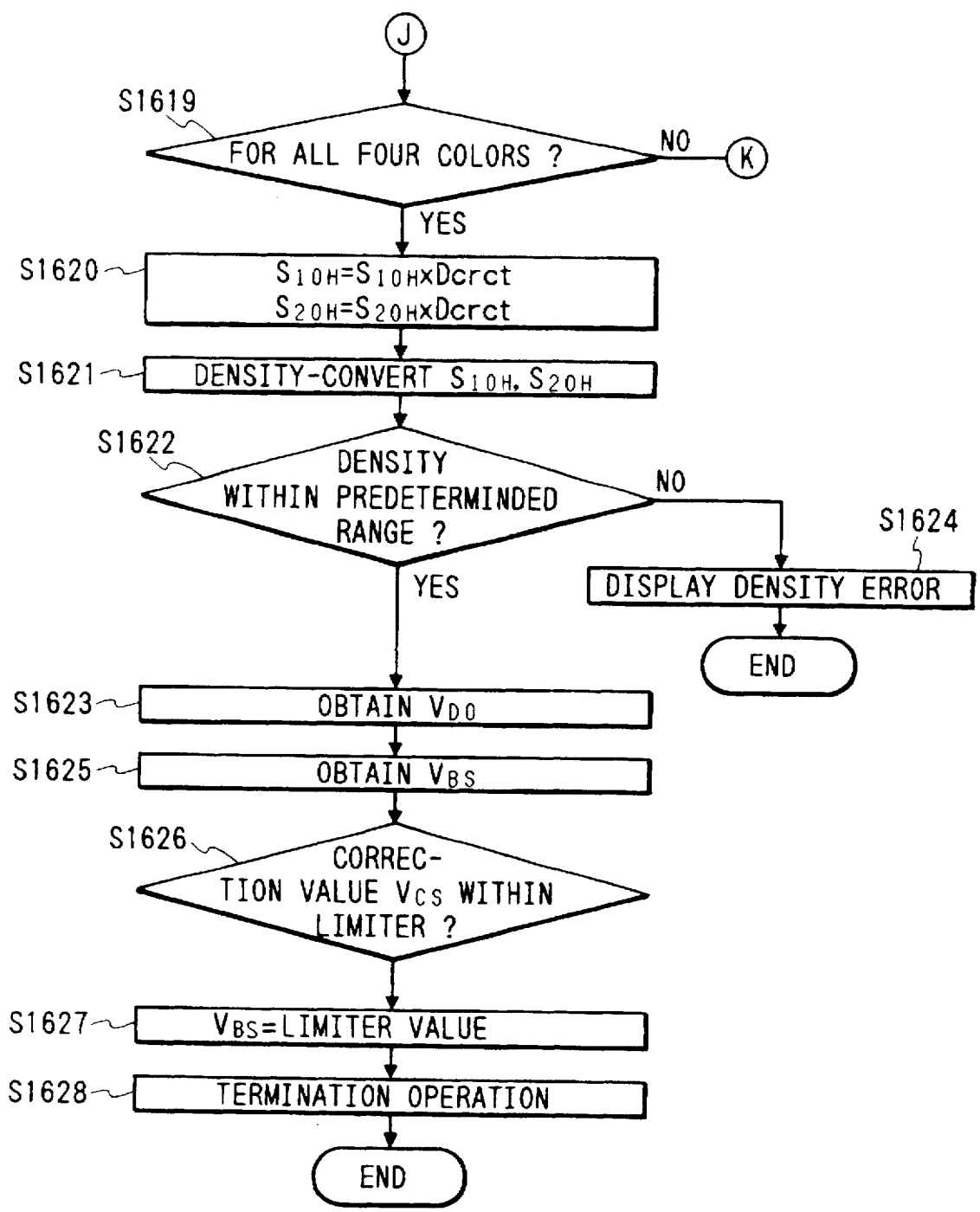

Since the low density output stable control to be described below is similar to the above-mentioned high density output stable control, only differences will be described below with reference to FIG. 28. The differences from the high density output stable control are that sample image data is output twice, and a different feedback method is adopted.

Blocks S1600 to S1609 are the same as blocks S1500 to S1509 described above, and a detailed description thereof will be omitted. In this manner, the process A, the process B, the process C, the sensor window stain correction control, and the potential deflection confirmation control necessary for the low density output stable control are executed.

In blocks S1610 to S1619, $VIDEO_P=10_H$ and $VIDEO_P=20_H$ are set in the pattern generation unit 113. The developing operations of these latent images are performed. Thereafter, data $S_{10H}$ and $S_{20H}$ from which the influences of the drum eccentricity, a change over time in output from the ATR lamp 503, and a variation in power supply are removed are obtained in correspondence with four colors.

The data $S_{10H}$ and $S_{20H}$ for each developing color are multiplied with the window stain correction value $D_{crct}$ obtained in the window stain correction control, thereby performing window stain correction (S1620).

The corrected data $S_{10H}$ and $S_{20H}$ are density-converted to data $D_{10H'}$ and $D_{20H'}$ using the sensor signal-density table shown in FIG. 23.

Figure 29:
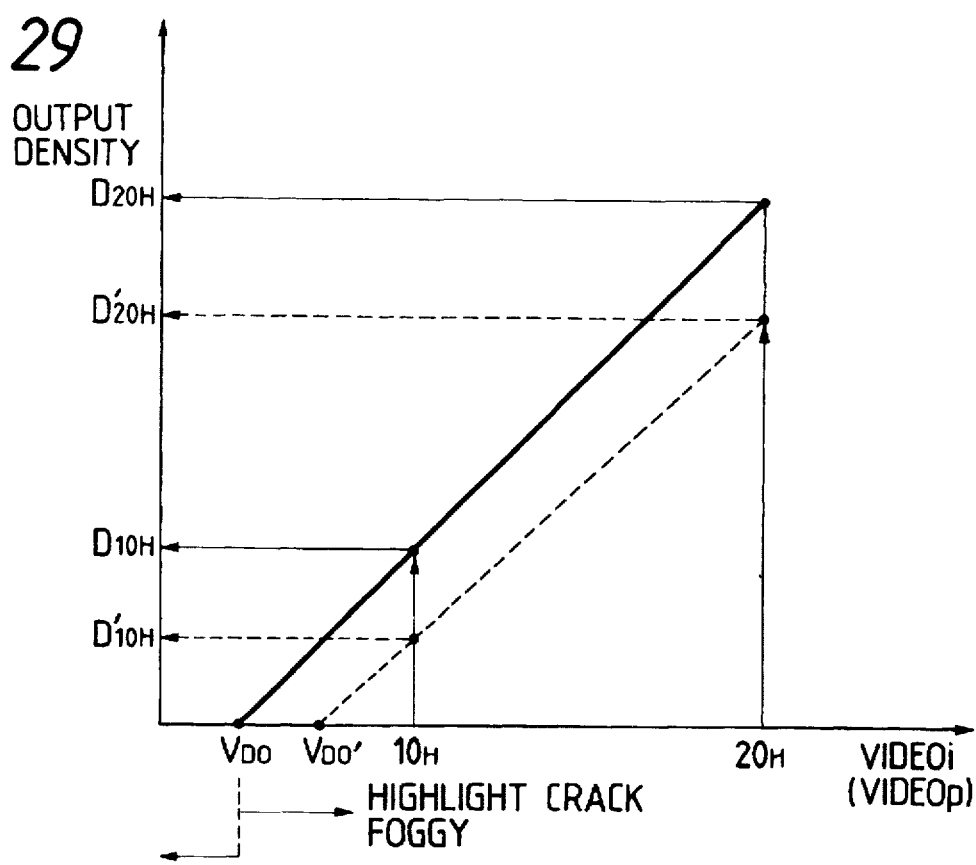
FIG. 29 is a graph showing the relationship between the image signal $VIDEO_P$ set in the pattern generation unit, and the output density.

FIG. 29 shows the relationship between the measurement values $D_{10H'}$ and $D_{20H'}$ and ideal values $D_{10H}$ and $D_{20H}$. In FIG. 29, the ideal values $D_{10H}$ and $D_{20H}$ are indicated by solid lines, and the corrected measurement values $D_{10H'}$ and $D_{20H'}$ are indicated by dotted lines.

When the calculated corrected measurement values cannot fall within a predetermined range (e.g., within ±20% of the ideal values), it is determined that troubles associated with a high voltage control system, a laser exposure system, and the like occurred (S1622). Thus, the following image forming operation is inhibited, and an error message is displayed (S1624).

An x-axis ($VIDEO_P$) intercept VD0' is calculated from the calculated corrected measurement value. The x-intercept VD0' is a setting value for yielding a density "0" even when $VIDEO_P$ is set to be VD0'. An ideal value VD0 of the x-intercept is not 00H, but has a value not to output a density for a low-density image signal in addition to the above-mentioned fog removing potential $V_B$.

When the calculated value VD0' is larger than the ideal x-intercept VD0, a highlight crack image output is obtained; when it is smaller than the ideal intercept, a foggy image output (a toner is output on a blank portion) is obtained.

In this manner, as the characteristic feature of this embodiment, an unstable VD0' is not measured using $VIDEO_P=00_H$, but VD0' is calculated from relatively stable two points, i.e., $VIDEO_P=10H$ and $VIDEO_P=20H$.

A method of calculating a correction value $V_{BS}$ of the fog removing potential $V_B$ by utilizing the calculated VD0' will be described below.

A foggy output image can be converted to a normal image free from fogging when a value $V_B$ is increased. For this reason, when VD0'<VD0, $V_{BS}$ can be increased. Therefore, the following equation is calculated:

$$V_{BS}=((VD0-VD0')/VD0)\times V_B$$

The fog removing potential correction value $V_{BS}$ is added to $V_B$, i.e., the above-mentioned process C is performed using $V_{B'}=V_B+V_{BS}$. Thus, the calculated value VD0' can coincide with the ideal value VD0 (S1625).

When the fog removing potential correction value $V_{BS}$ cannot fall within a predetermined (e.g., 20% of $V_B$) (S1626), the fog removing potential correction value $V_{BS}$ is set to be a limiter value (S1627). These operations are performed for four colors, and thereafter, a termination operation (S1628) is performed. Thus, the operation is terminated.

The calculated fog removing potential correction value $V_{BS}$ is stored in the backup RAM area, where data is not broken after power-off, together with date data in the timer 206. This data is utilized when the control history is confirmed.

(Middle Density Output Stable Control)

The middle density output stable control is preferably performed after the above-mentioned high density output stable control and low density output stable control. However, this control may be solely executed.

The middle density output stable control will be described below with reference to FIGS. 31 to 35. To summarize the middle density output stable control, a middle density grayscale pattern is output and is measured by the sensor 600, and the measurement data is fed back to a so-called γ table.

The process A and the process B are executed to obtain the relationship among the environmental contrast potential $V_C$, the grid bias $V_G$, the light potential $V_L$, and the dark potential $V_D$ (S1700). When the high or low density output stable control was performed previously, the contrast potential $V_{CONT}$ for each developing color is corrected by the correction contrast potential $V_{CS}$:

$$V_{CONT}=V_C+V_{CS}$$

In addition, the fog removing potential $V_B$ is also corrected by the fog removing potential correction value $V_{BS}$ (S1701):

$$V_{B'}=V_B+V_{BS}$$

At this time, when the high or low density output stable control was performed even once previously, the correction contrast potential $V_{CS}$ and the correction fog removing potential $V_{BS}$ backed up in the RAM 44 may be utilized.

When high or low density output stable control is not performed previously, an operation can be performed to have $V_{CS}=0$ and $V_{BS}=0$.

The process C is performed using the corrected contrast potential $V_{CONT}$ and fog removing potential $V_{B'}$ (S1702), thereby obtaining the grid bias value $V_G$ and the developing bias DC part $V_{db}$ for each developing color.

Thereafter, the window stain correction control and the potential deflection confirmation control are performed as needed (S1703, S1705). When a window stain or potential deflection is considerable, and an error that disturbs middle density output stable control occurs (S1704, S1706), the operation is ended.

The photosensitive body drum 19 is rotated to perform a developing operation (S1707), the grid bias value $V_G$ for each developing color obtained in the process C is output (S1708), and the corresponding developing machine is moved (S1709). In order to avoid the surface of the transfer drum 27 from being stained, the transfer cleaning operation is performed (S1710).

An output image selection operation as the feature of the middle density output stable control will be described below. The present inventors experimentally confirmed that an unstable output density was mainly caused by an environmental variation, and the degrees of influences varied depending on developing colors. Therefore, a density level of a measurement image to be output only upon an environmental variation, a density level of a measurement image to be output after an elapse of a predetermined period of time after the previous measurement, and a density level of a measurement image to be always output are stored as a table as shown in FIG. 30, and an optimal output density level can be selected in units of colors (S1711).

A case will be exemplified below wherein the developing color is magenta, and a predetermined period of time has elapsed from the previous measurement. In this case, output levels $VIDEO_P$=40H, 60H, A0H, and E0H. Images at these output levels are output a necessary number of times in correspondence with necessary colors in synchronism with ITOP signals, and the output images are measured by the sensor 600 (S1712 to S1717).

Figure 35:
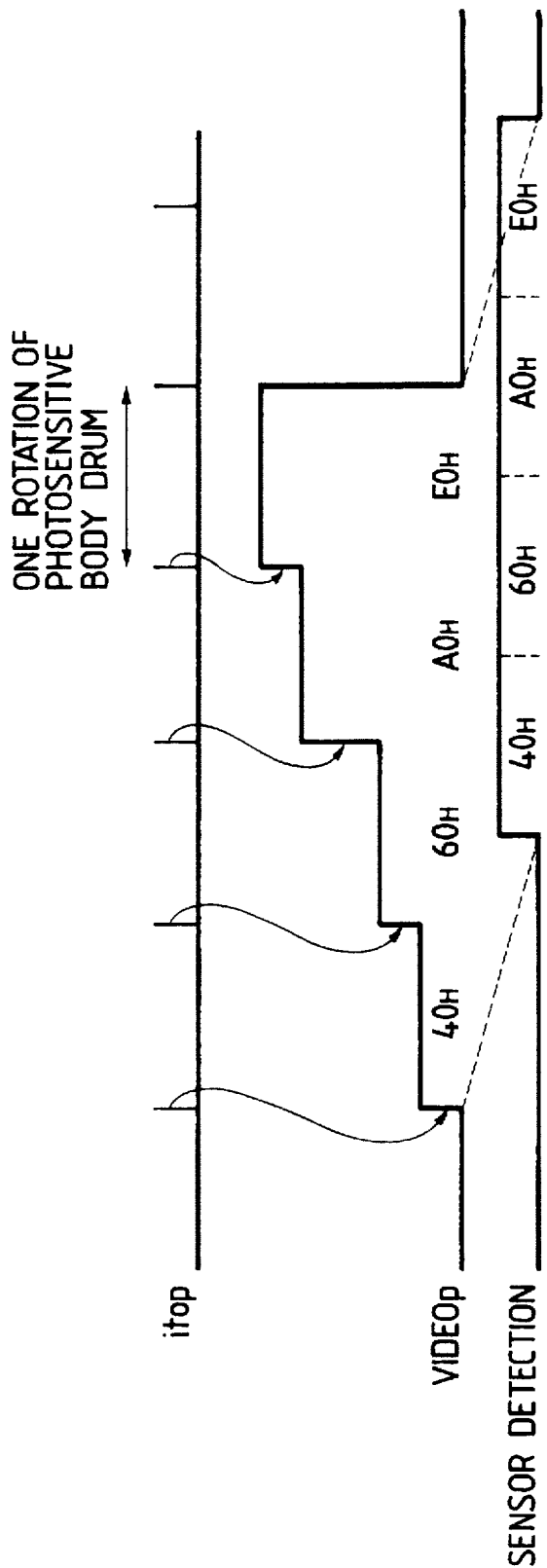
FIG. 35 is a timing chart showing a processing timing of the middle density output stable control.

FIG. 35 shows the relationship among timings at that time. $VIDEO_P$ is changed to 40H, 60H, A0H, and E0H, and corresponding images are output for one rotation of the photosensitive body drum. These images are continuously detected by the sensor, and a data error caused by the eccentricity of the photosensitive body drum 19 is corrected. In addition, a change over time in output from the ATR lamp 603 is also corrected.

These measured data are corrected by the window stain correction value $D_{crct}$ (S1718), and the corrected data are converted to $D_{40H}$, $D_{60H}$, $D_{A0H}$, and $D_{E0H}$ (S1719). At this time, these data must monotonically increase. Therefore, it is checked if the data monotonously increase (S1720). If an error is detected, formation of the $\gamma$ table (to be described later) is not performed. In this case, $\gamma$ correction is performed using the $\gamma$ table formed in the previous correction operation or a basic $\gamma$ table.

When the data are separated from the ideal density data by a given value (S1721), the density data are limited so as not to cause an error in the $\gamma$ table to be formed (S1722).

Figure 31:
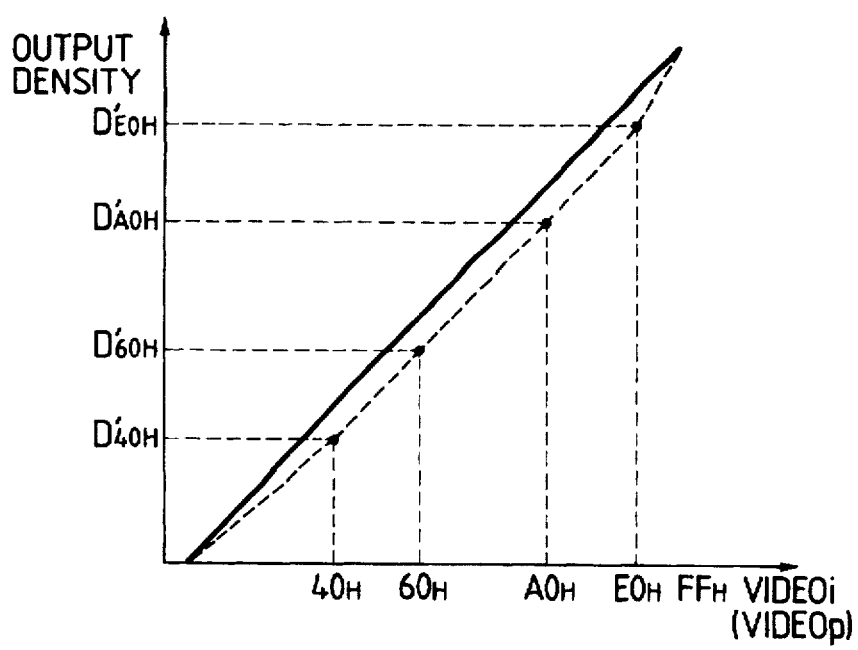
FIG. 31 is a graph showing the relationship between the image signal $VIDEO_P$ set in the pattern generation unit, and the output density.

FIG. 31 shows the relationship between the output image signal $VIDEO_P$ and the output density in this state. Measurement data are indicated by dotted lines, and ideal data is indicated by a solid line. The dotted lines are formed by linearly interpolating measurement points. As can be understood from FIG. 31, no density is output for the ideal data in this case.

Figure 32:
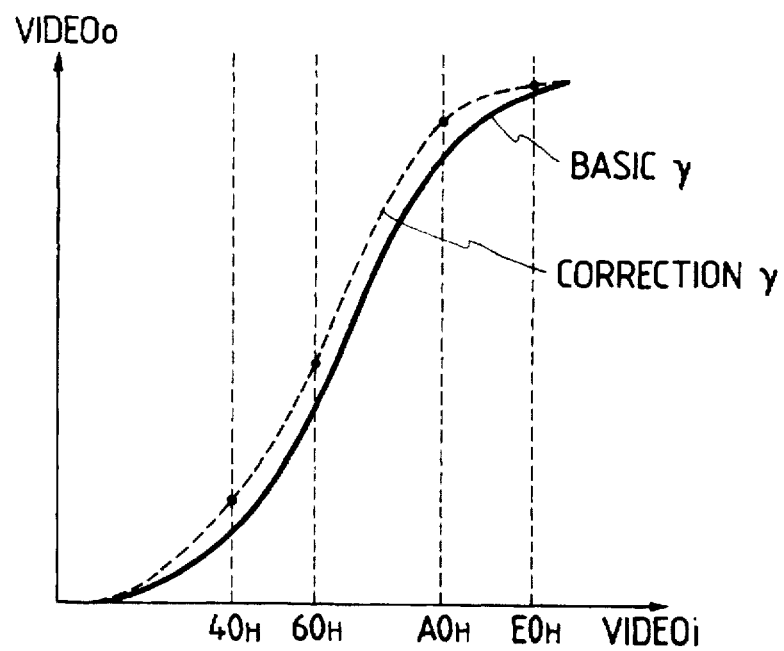
FIG. 32 is a graph showing the relationship between the inputs and outputs of a density conversion unit.
Figure 34:
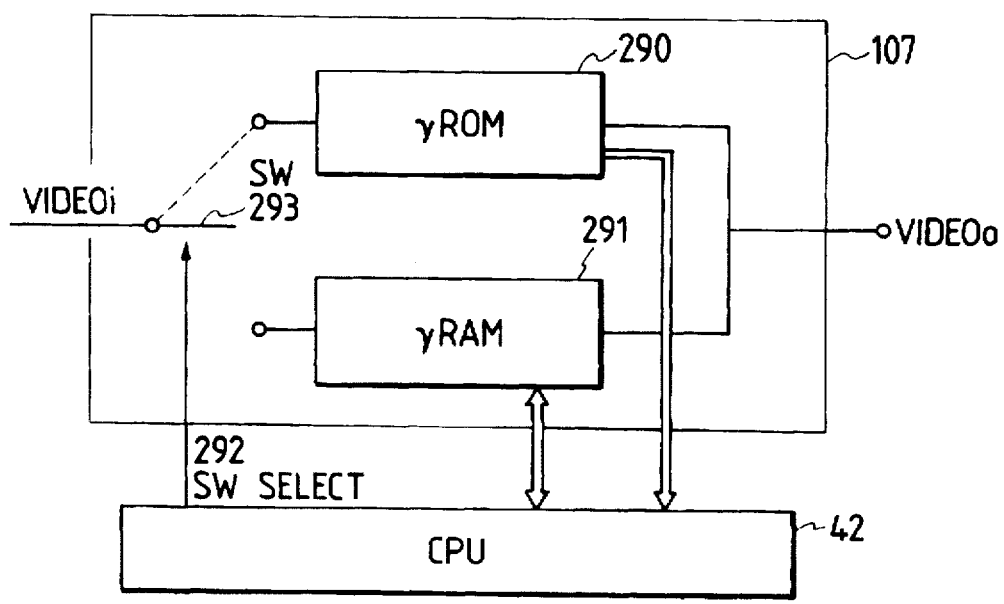
FIG. 34 is a block diagram showing the arrangement of the density conversion unit.
Figure 33B:
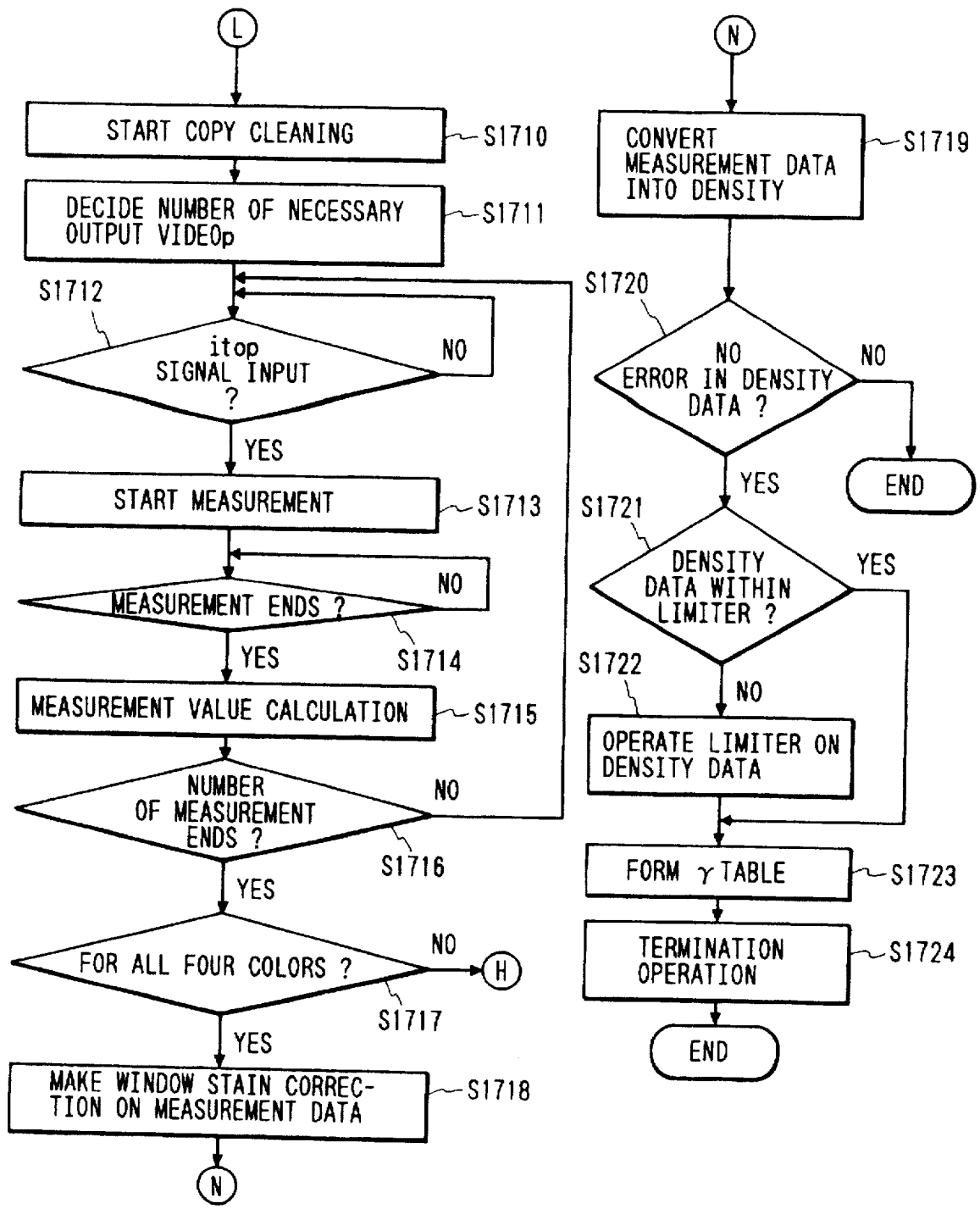
FIG. 33. consisting of FIGS. 33A and 33B. is a flow chart showing middle density output stable control.

FIG. 32 shows the relationship between the input ($VIDEO_i$) and the output ($VIDEO_o$) to and from the density conversion unit 107 in the image processing unit 49. This is normally called a $\gamma$ table, and a solid curve pattern varies depending on developing colors and on an operation of a density lever (not shown) on the operation unit 51. In this embodiment, a basic $\gamma$ curve as the solid curve is stored in a RAM 290 in FIG. 34, and a correction $\gamma$ curve is stored in a RAM 291. These curves are selectively used by switching an SW 293 by an SW select signal 292, as needed.

Inverse conversion is performed based on the values $D_{40H}$, $D_{60H}$, $D_{A0H}$, and $D_{E0H}$ shown in FIG. 31 to yield ideal values $D_{40H}$, $D_{60H}$, $D_{A0H}$, and $D_{E0H}$, thereby forming the correction $\gamma$ curve shown in FIG. 32 (S1723). At this time, a method of correcting density data other than the measured density data $D_{40H}$, $D_{60H}$, $D_{A0H}$, and $D_{E0H}$ may be arbitrarily selected. As the simplest method, linear interpolation is known. This operation is performed for four colors.

In general, since a basic $\gamma$ table varies depending on Y, M, C, and Bk colors, color patches are formed in units of colors, as described above, and correction $\gamma$ tables are formed in units of colors.

After the $\gamma$ tables are formed, the operated loads are stopped (S1724), thus ending the operation.

The above-mentioned image stabilization parameters can be displayed on the display section of the operation unit 51 upon depression of a special-purpose input key for a service person in the apparatus, and a key on the operation unit 51. FIGS. 36 and 37 show display examples when, for example, the display section comprises a liquid crystal display.

FIG. 36 shows a case wherein the latest parameter values are displayed, and FIG. 37 shows a case wherein parameter histories in units of developing colors are displayed. These displays are switched by using the key on the operation unit 51. These data can be used as proper service information in adjustment by a service person.

Figures 38, 38A:
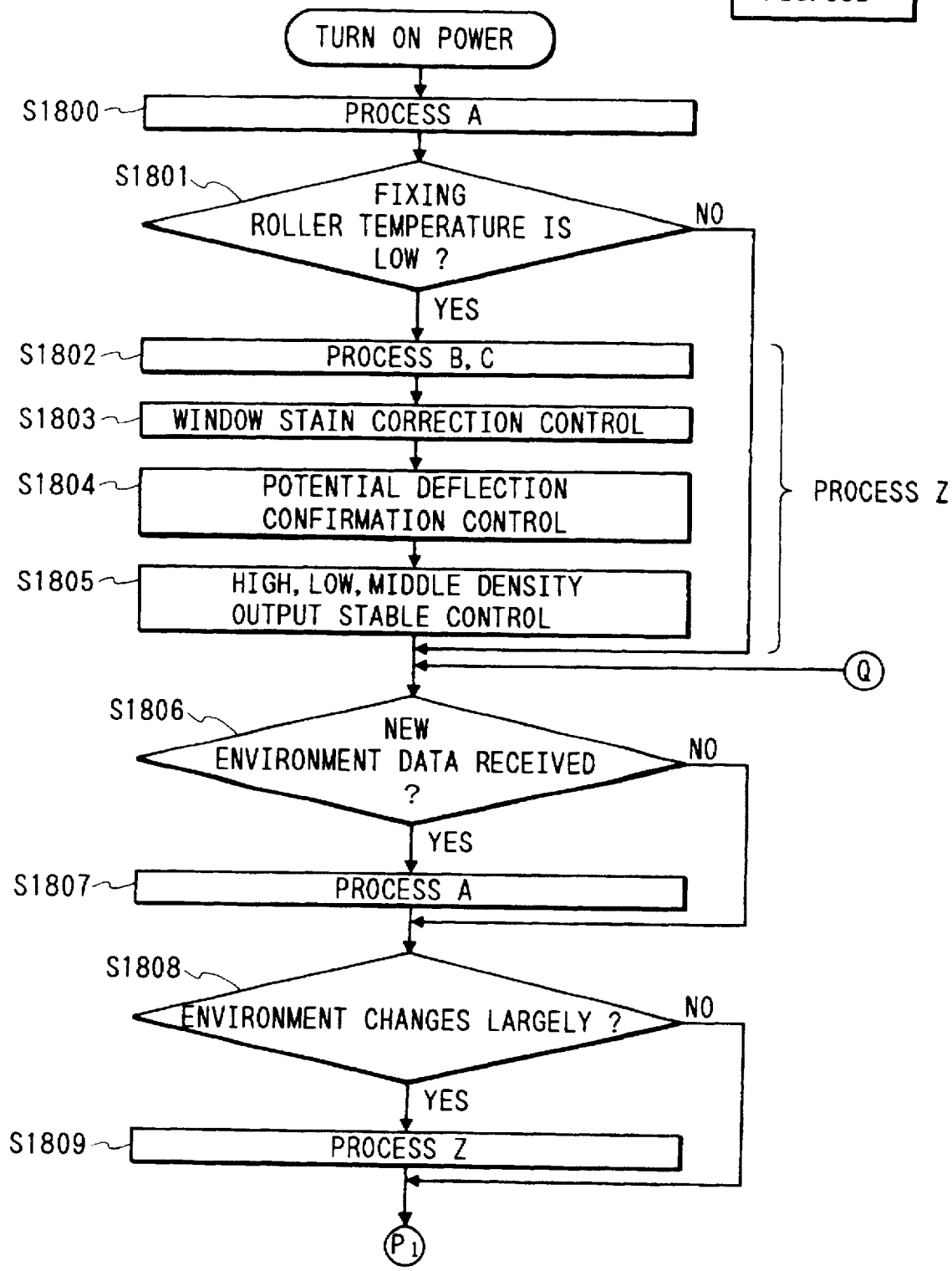
FIG. 38. consisting of FIGS. 38A and 38B. is a flow chart showing image stable control processing.
Figure 38B:
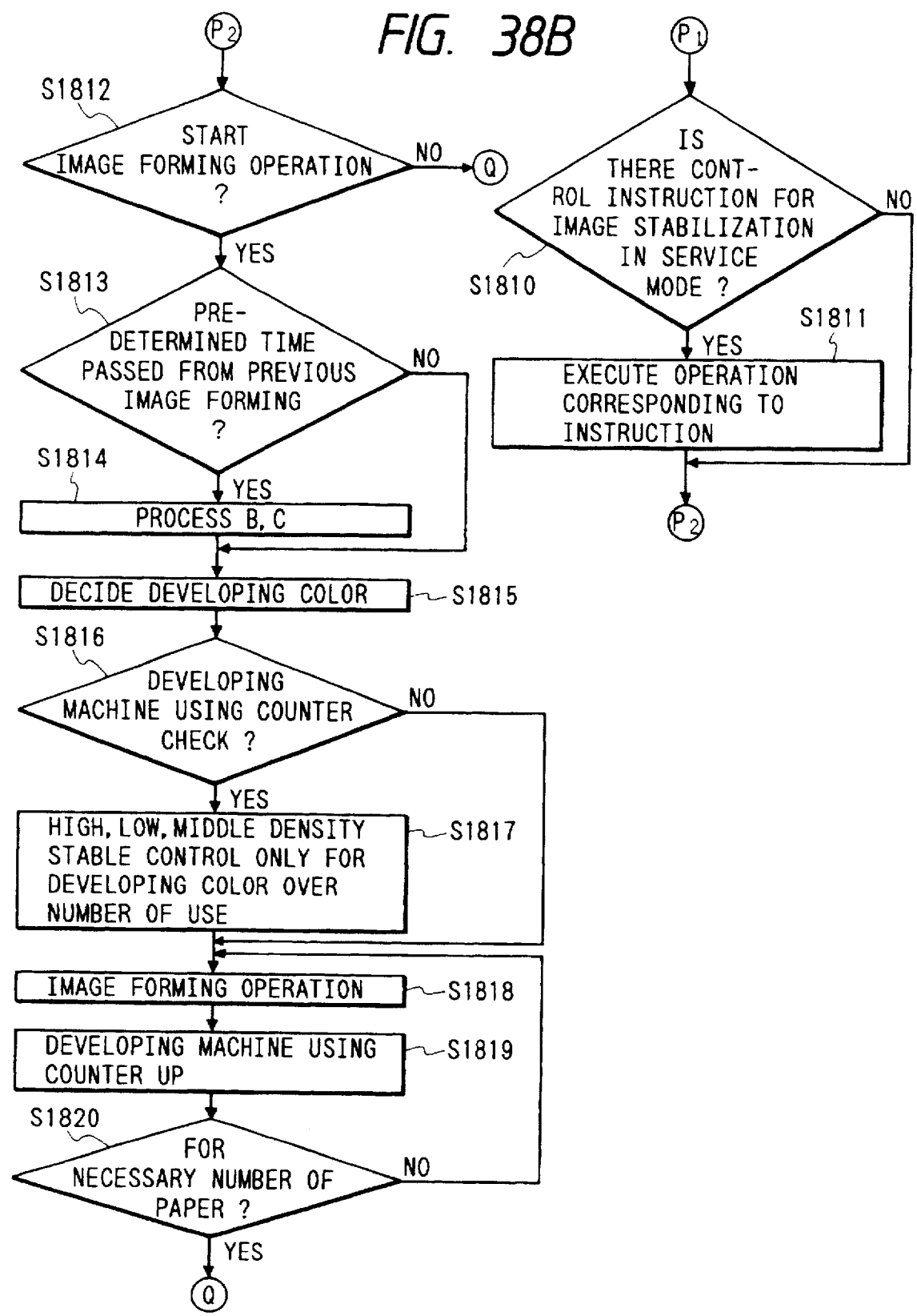

How to use the image stabilization control described above will be described below with reference to the flow chart shown in FIG. 38.

After the power switch is turned on, present environment data are stored in an 8-hour buffer, and the process A is performed (S1800). Normally, when the power switch is turned on, the temperatures of the fixing roller 6a and the compression roller 6b are the same as the room temperature. The temperature of the fixing roller is detected by a fixing roller temperature detection sensor 202. When the measured temperature is equal to or lower than a predetermined temperature (S1801), an image stabilization control operation to be described below is performed by utilizing a fixing roller warming-up time.

The process B and the process C (S1802), the sensor window stain correction control (S1803), the potential deflection confirmation control (S1804), the high, low, and middle density output stable control operations (S1805) are executed. A series of these processing operations will be referred to as a Z process hereinafter.

At this time, overlapping operations can be omitted, as needed.

When a window stain error flag or potential deflection error flag is set in the sensor window stain correction control or potential deflection confirmation control, new $V_{CS}$, $V_{BS}$, and $\gamma$ tables are not formed, and operations are performed using data backed up in the previous image stabilization control.

As processing until the start of the next image forming operation is instructed from the operation unit 51, when new environment data for every 30 minutes is received, the process A is executed (S1807), and the environmental contrast potential $V_C$ is re-calculated.

Humidity data calculated based on the environment data are monitored. When a difference from previous data exceeding a predetermined value is detected, it is determined that the environment changed largely (S1808), and the above-mentioned process Z is executed (S1809).

Thus, density unstable factors due to an environmental variation are removed, and a stable output image can be obtained in an image forming operation.

Figure 39:
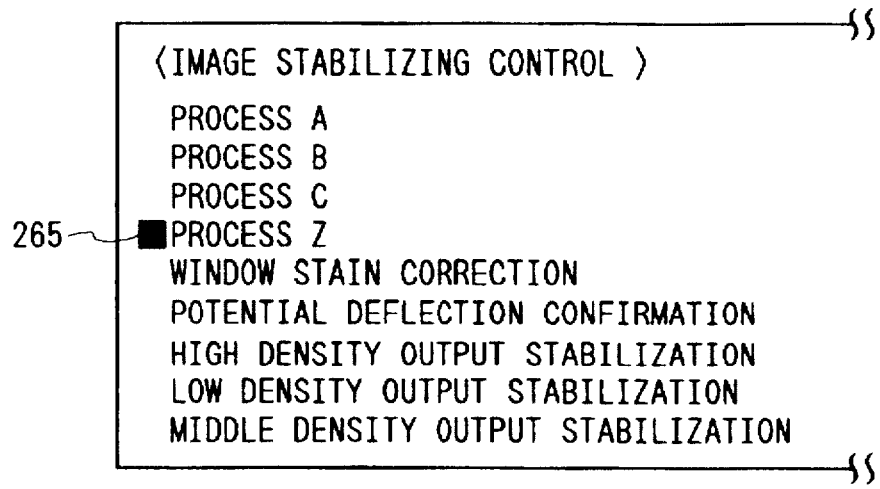
FIG. 39 is a view showing selection screen data of image stabilization control.

It is then checked to see if there is an instruction for performing respective element control operations of the image stabilization control in a service mode upon operation of the service switch in the apparatus, and the operation unit 51 (S1810). FIG. 39 shows a state when the instruction is issued.

FIG. 39 shows the liquid crystal display section provided to the operation unit 51. When a cursor 265 displayed on the display section is moved using cursor moving keys on the operation unit 51, and a start key (not shown) is depressed at a selected position, the CPU 42 discriminates the selected processing, and the selected image stabilization control can be solely executed (S1811).

When the start key is depressed in a normal mode, an image forming operation is started (S1812).

At this time, if a predetermined period of time has elapsed from the previous image forming operation (S1813), it is determined that the light potential $V_L$ and the dark potential $V_D$ are changed, and the process B and the process C, i.e., potential control operations, are performed (S1814). The developing machines to be used are then determined on the basis of a color mode designated at the operation unit 51 (S1815).

Developing machines using counters, which perform a count operation in the image forming mode, are checked (S1816).

Of the developing machines to be used, if the corresponding developing machine using counter value exceeds a predetermined value, the high, low, and middle density output stable control operations are performed for only the corresponding developing color, and the developing machine using counter is reset (S1817).

Thereafter, an image forming operation is performed (S1818), and the using counters of the developing machines used are counted upon in units of developing operations (S1819). Upon completion of the image forming operations corresponding to a designated copy count (S1820), whether or not environment data for every 30 minutes is received is checked (S1806). The above-mentioned operation is continued while the power switch is kept ON.

In the above-mentioned embodiment, the black toner is assumed as a two-component toner which uses a polyester-based resin as a binder, and carbon black as a coloring agent. Alternatively, a one-component magnetic toner may be used. The one-component magnetic toner uses magnetite as a coloring agent, and contains 35% to 120% of magnetite with respect to 100% of a binder. The reflectance of the one-component black toner for near-infrared light (960 nm) is substantially the same as that of a black toner using carbon black as a coloring agent, i.e., 10% or less, and can be used in image stabilization control by the same density detection method.

In the above embodiment, the black toner is assumed as a two-component toner which uses a polyester-based resin as a binder, and carbon black as a coloring agent. Alternatively, a black toner, which uses a polyester-based resin as a binder, and blue, red, and yellow pigments as coloring agents, may be used.

At this time, the reflectance of the one-component black toner for near-infrared light (960 nm) is 80% or more, and toner density detection of this black toner is performed by the same method as the toner detection method for the magenta, cyan, and yellow toners described in the above embodiment.

Therefore, a toner density detection developing region need not be formed on the photosensitive body drum.

Figure 40:
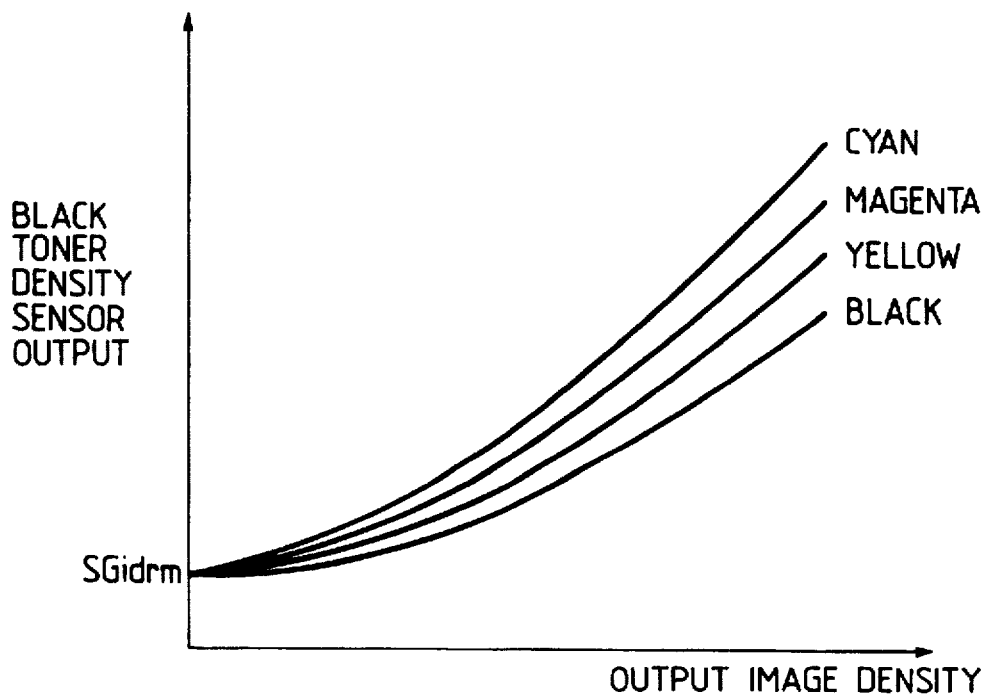
FIG. 40 is a graph showing the relationship between the output density and the sensor output when black toners having different characteristics are used.

A table to be used in output density conversion in the high, low, or middle density output stable control in this case is not one shown in FIG. 23, but one shown in FIG. 40.

In this manner, the density conversion table shown in FIG. 40 is used, and the output from the sensor 600 in a state without toner attachment, i.e., an initial signal value $SG_{idrm}$, is set to be lower than that in the above embodiment. Thus, better control can be attained.

In the black toner density detection operation described in the above embodiment, when the sensor window stain correction value $D_{crct}$ is introduced, the toner supply time Tst can be expressed by:

$$Tst=((RFiBk/RFcBk) \times SGcBk \cdot D_{crct} - SGiBk) \times K$$

Thus, an error of a signal value from the light-receiving unit 602 caused by a toner attached to the outer surface of the black toner density detection sensor 600 can be corrected, and the toner density detection operation can be performed more precisely.

In the high, low, or middle density output stable control of the above embodiment, in order to correct a measurement error caused by the eccentricity of the photosensitive body drum 19, an image of a predetermined density is formed on the photosensitive body drum 19 for one rotation, and is continuously measured. Then, an average value of measurement data is calculated to obtain a measurement value. However, this method undesirably increases toner consumption, and prolongs the measurement time.

Figure 41:
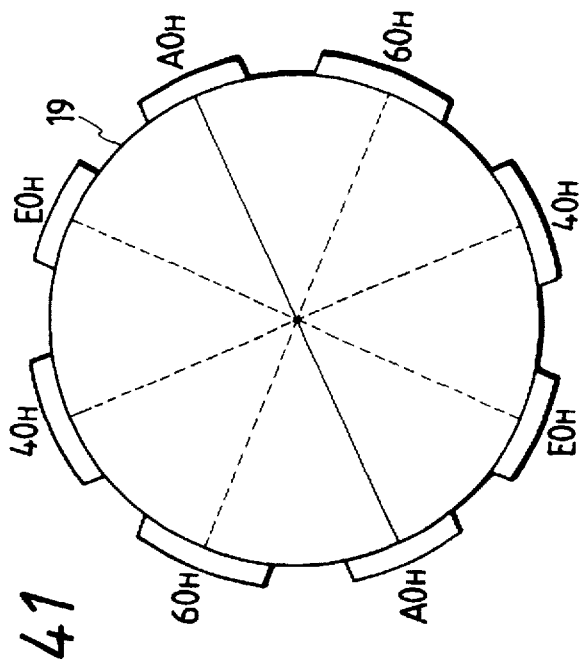
FIG. 41 is a view showing the principle when density detection images of a plurality gray-scale levels are output onto the photosensitive drum.
Figure 42:
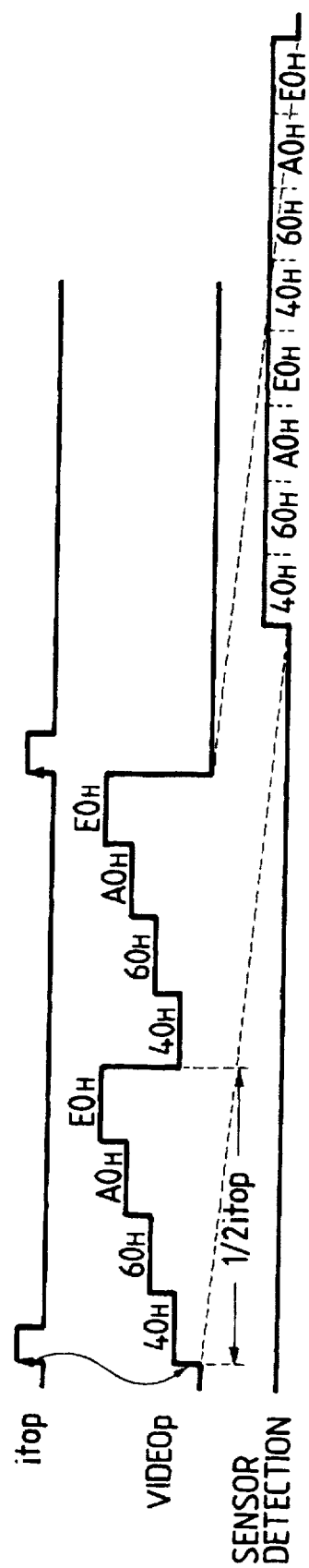
FIG. 42 is a timing chart showing a timing when density detection images of a plurality gray-scale levels are output onto the photosensitive drum. and are measured.

For this reason, since a measurement signal shown in FIG. 24 changes at a cycle corresponding to one rotation of the photosensitive body drum 19, density measurement output images are formed on two 180°-opposed areas on the photosensitive body drum 19, and are measured. Then, an average value of the measurement values of the two areas can be calculated to obtain a result equivalent to the average value of the above embodiment. FIG. 41 is a schematic view showing output images on the photosensitive body drum at this time. FIG. 42 is a timing chart corresponding to FIG. 35 at this time.

In place of a printer using an electrophotographic process, the present invention may be applied to a bubble-jet type printer, which generates bubbles by heat, and discharges an ink by the pressure of the bubbles. In this case, sample images may be formed on recording sheets in units of color inks, and their densities may be measured so as to control γ characteristics and ink discharge amounts.

The present invention is not limited to the above embodiment, and various changes may be made within the scope of claims.

What is claimed is:
1. An image forming apparatus comprising:
    generating means for generating an image signal representing an image of a predetermined density;
    image forming means for forming an image on a recording medium on the basis of the image signal generated by said generating means;
    measurement means for measuring a density of the image formed on the recording medium; and
    control means for determining a condition for image formation on the basis of a measurement result from said measurement means,
    wherein said control means selects a density of the image signal to be generated by said generating means for the measurement of the density according to a change of an environment around said image forming means or an elapsed time from a next-preceding measurement.
2. An apparatus according to claim 1, wherein said generating means generates image signals representing a plurality of images having different gray-scale levels.
3. An apparatus according to claim 1, wherein said image forming means comprises visualizing means of a plurality of colors for forming color images, and said control means selects the density of the image signal to be generated from said generating means according to a visualizing color of the visualizing means to be used.

4. An apparatus according to claim 1, wherein said control means forms a conversion table for converting a density on the basis of the measurement result from said measurement means.

5. An apparatus according to claim 1, wherein said control means comprises a memory for storing data representing a relationship between the environment around said image forming means or the operation time of said image forming means, and the density of the image signal to be generated from said generating means.

6. An image forming apparatus comprising:

image forming means for forming an image on a recording medium;

measurement means for measuring through a transparency member a density of the image formed on the recording medium, said measurement means comprising a lamp for illuminating the recording medium, a first light receiving element for receiving light directly from said lamp and a second light receiving element for receiving reflected light from the recording medium illuminated by said lamp and measuring density of the image formed on the recording medium, based on outputs of the first and second light receiving elements;

calculating means for calculating a correction coefficient on the basis of the outputs of the first and second light receiving elements provided in a state wherein the image is not formed on the recording medium;

correction means for correcting a measurement result from said measurement means in a state wherein the image is subsequently formed on the recording medium on the basis of the correction coefficient calculated by said calculating means; and control means for determining a condition for image formation on the basis of the measurement result corrected by said correction means.

7. An apparatus according to claim 6, wherein said image forming means forms images of a plurality of colors and said measurement means includes a common sensor for measuring density of the image for each color.

8. An apparatus according to claim 7, wherein said image forming means forms a plurality of images having different densities for each color and the sensor measures in common the densities of the plurality of images.

9. An apparatus according to claim 6, wherein said correction means receives the measurement result from said measurement means in the state wherein no image is formed on the recording medium before said image forming means forms an image for density measurement on said recording medium.

10. An apparatus according to claim 6, wherein said image forming means forms a toner image on the recording medium, and said correction means corrects a measurement error due to a stain with toner of said measurement means.

11. An image forming apparatus comprising:

image forming means for forming an image on a recording medium;

first measurement means for measuring an environmental condition of surroundings of said image forming means;

second measurement means for measuring a density of the image formed on said recording medium; and control means for controlling execution of image stabilization control operation in accordance with said environmental condition, said image stabilization control operation being an operation for determining a condition for image formation on the basis of a measurement result from said second measurement means, wherein said control means executes the image stabilization control operation when a difference between a latest environmental condition measured by said first measurement means and a previously measured environmental condition is more than a predetermined value and does not execute the image stabilization control operation when the difference is less than the predetermined value.

12. An image forming apparatus comprising:

generating means for generating an image signal representing an image of a predetermined density;

image forming means for forming an image on a rotating drum shape recording medium on the basis of the image signal generated by said generating means;

measurement means for measuring a density of the image formed on the recording medium;

first control means for controlling said generating means, said image forming means and said measurement means so as to form a plurality of pairs of test images, having different densities respectively in the rotating direction of the recording medium, wherein two images of each pair of test images are the same density and formed on 180°-opposed regions of the recording medium, and to measure the densities of the formed each pair of test images; and second control means for obtaining an average value of the measured densities of the two images on the 180°-opposed regions for each pair of test images and determining a condition for image formation on the basis of the average value of each pair of test images.

13. An apparatus according to claim 12, wherein said second control means forms a conversion table for converting a density on the basis of the average value of the densities.

14. An image forming apparatus comprising:

image forming means for forming a toner image on a photosensitive body;

feeding means for feeding a transfer sheet;

a sheet holding number, arranged to be in contact with the photosensitive body, for holding the transfer sheet fed by said feeding means so as to transfer the toner image formed on the photosensitive body onto the transfer sheet;

a sensor for measuring a density of the toner image formed on the photosensitive body;

cleaning means for cleaning a surface of said sheet holding member; and control means for controlling said image forming means and said sensor to perform an image stabilization control operation in which the toner image of a predetermined density is formed on the photosensitive body, the density of the formed toner image is measured and an image forming condition is decided on the basis of the result of the measurement, wherein said control means stops feeding the transfer sheet to said sheet holding member during said image stabilization control operation and causes said cleaning means to be operative while the toner image is formed in said image stabilization control operation.

15. An apparatus according to claim 14, wherein said image forming means forms toner images of a plurality of color components.

16. An image forming apparatus comprising:

image forming means for forming a color image on a recording medium, said image forming means comprising a plurality of visualizing means corresponding to a plurality of colors;

count means for counting the number of times of use of each of said plurality of visualizing means;

measurement means for measuring a density of an image of each color formed on the recording medium; and control means for controlling execution of an image stabilization control operation in accordance with a count of said count means, the image stabilization control operation being an operation for determining a condition for image formation of each color on the basis of a measurement result from said measurement means, wherein said control means executes the image stabilization control operation of the color corresponding to a count value of said count means, which value exceeds a predetermined value and does not execute the image stabilization control operation of the color corresponding to a count value of said count means, which value does not exceed the predetermined value.

17. An apparatus according to claim 16, wherein said count means resets the count value of the color for which the image stabilization control is executed.

18. An image forming apparatus comprising:

image forming means for forming an image on a recording medium;

a sensor for measuring a density of the image formed on the recording medium;

control means for executing an image stabilization control operation for determining a condition for image formation on the basis of a measurement result from said sensor; and measurement means for measuring characteristics of said sensor or of the recording medium prior to the image stabilization operation, wherein said control means determines, according to a measurement result from said measurement means, whether or not the image stabilization control operation is executable and controls subsequent execution of the image stabilization control operation.

19. An apparatus according to claim 18, wherein said control means permits an image forming operation, and inhibits execution of the image stabilization control operation when the measurement result from said measurement means indicates a first state, and inhibits both the image forming operation and execution of the image stabilization control operation when the measurement result from said measurement means indicates a second state.

20. An apparatus according to claim 19, wherein said control means permits an image forming operation on the basis of the condition for image formation determined by the latest image stabilization control operation when the measurement result from said measurement means indicates the first state.

21. An apparatus according to claim 18, wherein said control means determines the condition for image formation for each color component.

22. An apparatus according to claim 18, wherein said measurement means measures a degree of stain of said sensor.

23. An apparatus according to claim 18, wherein said recording medium comprises a photosensitive body, and said measurement means measures charging characteristics of the entire surface of said photosensitive body.

* * * * *

UNITED STATES PATENT AND TRADEMARK OFFICE
CERTIFICATE OF CORRECTION

PATENT NO. : 5,752,126
DATED : May 12, 1998
INVENTOR : MASANORI MURAMATSU

It is certified that error appears in the above-identified patent and that said Letters Patent is hereby corrected as shown below:

COLUMN 1 line 50,   "changed," should read --charged--.

COLUMN 2 line 64,   "plurality" should read --plurality of--.

COLUMN 4 line 11,   "consists" should read --consisting--;
   line 51,   "plurality" should read --plurality of --; and
   line 54,   "plurality" should read --plurality of--.

COLUMN 6 line 66,   "favor" should read --instruction--.

COLUMN 8 line 61,   "is" should be deleted.

COLUMN 14 line 33,   "$V_G(V_{CONT}+V_B-(V_{D1}-V_{L1}))/(\alpha-\beta)+V_{G1}$" should read
               --$V_G=(V_{CONT}+V_B-(V_{D1}-V_{L1}))/(\alpha-\beta)+V_{G1}$--.

COLUMN 15 line 17,   "drum" should be deleted.

UNITED STATES PATENT AND TRADEMARK OFFICE
CERTIFICATE OF CORRECTION

PATENT NO. : 5,752,126

DATED : May 12, 1998

INVENTOR : MASANORI MURAMATSU

It is certified that error appears in the above-identified patent and that said Letters Patent is hereby corrected as shown below:

COLUMN 18 line 43, "density DFF'$_H$," should read --density $D_{FF'H}$,--.

COLUMN 21 line 39, "monotonously" should read --monotonically--.

COLUMN 23 line 31, "upon" should be deleted.

COLUMN 27 line 27, "control" should read --control operation--.

Signed and Sealed this

First Day of December, 1998

Attest:

BRUCE LEHMAN

Attesting Officer

Commissioner of Patents and Trademarks